United States Patent
Hagimoto et al.

(10) Patent No.: US 12,449,057 B2
(45) Date of Patent: Oct. 21, 2025

(54) ELECTRIC VALVE CONTROL DEVICE, ELECTRIC VALVE DEVICE, AND METHOD FOR CONTROLLING ELECTRIC VALVE

(71) Applicant: FUJIKOKI CORPORATION, Tokyo (JP)

(72) Inventors: Hiroshi Hagimoto, Tokyo (JP); Yusuke Ishizuka, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 18/832,401

(22) PCT Filed: Jan. 30, 2023

(86) PCT No.: PCT/JP2023/002780
§ 371 (c)(1),
(2) Date: Jul. 23, 2024

(87) PCT Pub. No.: WO2023/153251
PCT Pub. Date: Aug. 17, 2023

(65) Prior Publication Data
US 2025/0116346 A1   Apr. 10, 2025

(30) Foreign Application Priority Data
Feb. 14, 2022 (JP) ................... 2022-020590

(51) Int. Cl.
*F16K 31/04* (2006.01)
(52) U.S. Cl.
CPC .................. *F16K 31/046* (2013.01)
(58) Field of Classification Search
CPC .... F16K 31/046; F16K 31/50; F16K 37/0041; H02P 8/36; H02P 29/024
See application file for complete search history.

(56) References Cited

U.S. PATENT DOCUMENTS

| | | | | |
|---|---|---|---|---|
| 4,911,404 A | * | 3/1990 | Dorste | F16K 47/04 251/129.08 |
| 5,226,454 A | * | 7/1993 | Cabalfin | F16K 31/045 251/129.01 |

(Continued)

FOREIGN PATENT DOCUMENTS

| | | |
|---|---|---|
| JP | 2005027370 A | 1/2005 |
| JP | 2007326279 A | 12/2007 |

(Continued)

OTHER PUBLICATIONS

"PCT International Search Report" and "PCT Written Opinion of the International Searching Authority" for the corresponding PCT application No. PCT/JP2023/002780, mailed Apr. 18, 2023, with English translation, 13 pages.

(Continued)

*Primary Examiner* — Eric Keasel
(74) *Attorney, Agent, or Firm* — LUCAS & MERCANTI, LLP

(57) ABSTRACT

An electric valve control device inputs pulses to a stepping motor to rotate a rotor in a second direction; inputs pulses to the stepping motor to rotate the rotor in a first direction when the electric valve is in a second-direction-rotation restricted state; obtains the number of pulses (an input number (Xi)) input to the stepping motor from the second-direction-rotation restricted state to a first-direction-rotation restricted state when the electric valve is in the first-direction-rotation restricted state while the rotor rotates in the first direction; determines that the rotor can rotate normally when the input number (Xi) is greater than or equal to a design number (Xd) and is smaller than or equal to an upper limit number (Xu); and determines that the rotor cannot rotate normally when the input number (Xi) is smaller than the design number (Xd) or is greater than the upper limit number (Xu).

7 Claims, 17 Drawing Sheets

(56) References Cited

U.S. PATENT DOCUMENTS

| | | | | |
|---|---|---|---|---|
| 5,461,290 A | * | 10/1995 | Tice | ............... F16K 31/046 |
| | | | | 318/431 |
| 5,518,015 A | * | 5/1996 | Berget | ............... F16K 31/04 |
| | | | | 137/554 |
| 9,310,114 B2 | * | 4/2016 | Wakisaka | ............... F25B 41/35 |
| 10,935,155 B2 | * | 3/2021 | Zhang | ............... F25B 41/35 |
| 2015/0020540 A1 | | 1/2015 | Wakisaka et al. | |
| 2019/0178404 A1 | | 6/2019 | Zhang et al. | |

FOREIGN PATENT DOCUMENTS

| | | |
|---|---|---|
| JP | 2013-156006 A | 8/2013 |
| JP | 2016-156447 A | 9/2016 |
| WO | 2019130928 A | 7/2019 |

OTHER PUBLICATIONS

Notice of Reasons for Refusal, dated Dec. 3, 2024, issued for the corresponding Japanese Patent Application No. 2024-062620, 5 pages, with English translation.

Notice of Reasons for Refusal, dated Apr. 1, 2025 issued for the corresponding Japanese Patent Application No. 2024-062620, 6 pages, with English translation.

* cited by examiner

|  | P[1] | P[2] | P[3] | P[4] | P[5] | P[6] | P[7] | P[8] | NOTE |
|---|---|---|---|---|---|---|---|---|---|
| A-PHASE STATOR | + | + | O | − | − | − | O | + | +: A1→A2<br>O: OFF<br>−: A2→A1 |
| B-PHASE STATOR | O | + | + | + | O | − | − | − | +: B1→B2<br>O: OFF<br>−: B2→B1 |

FIG.5
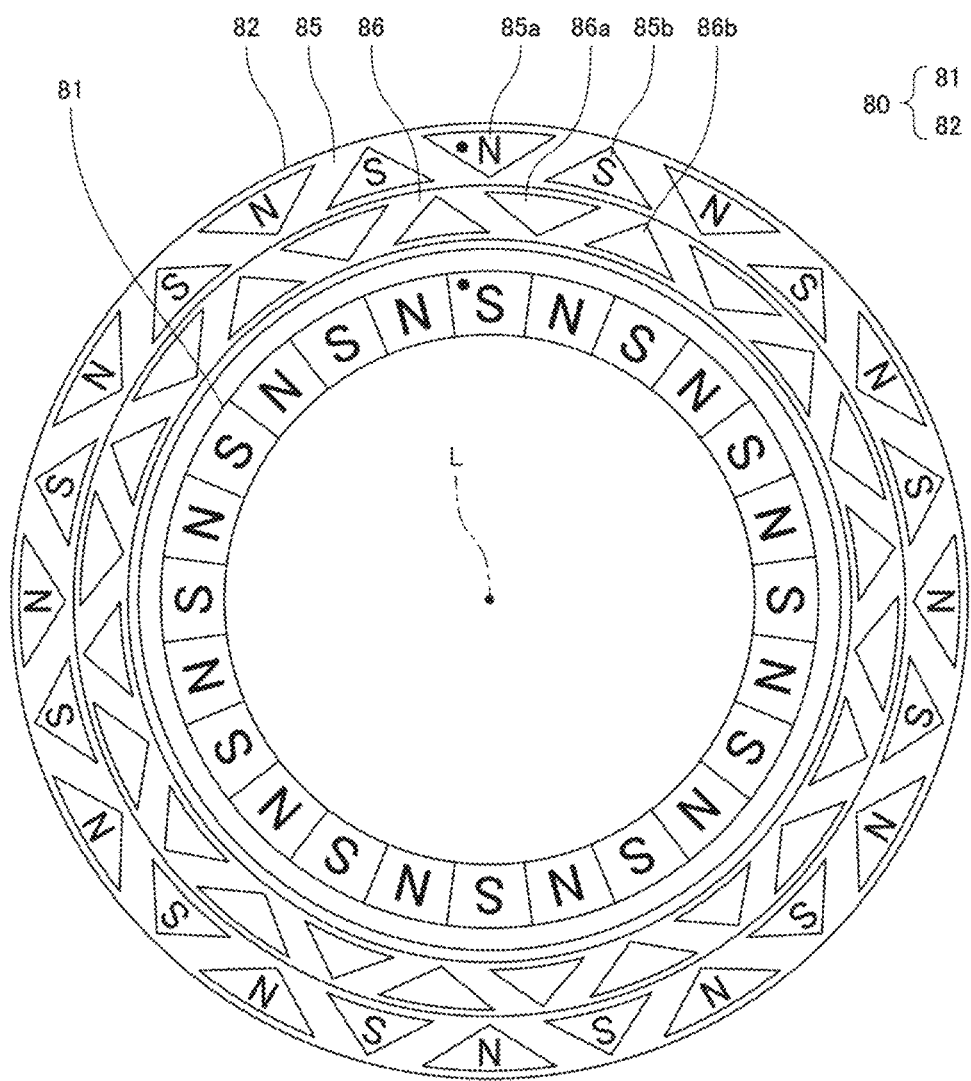
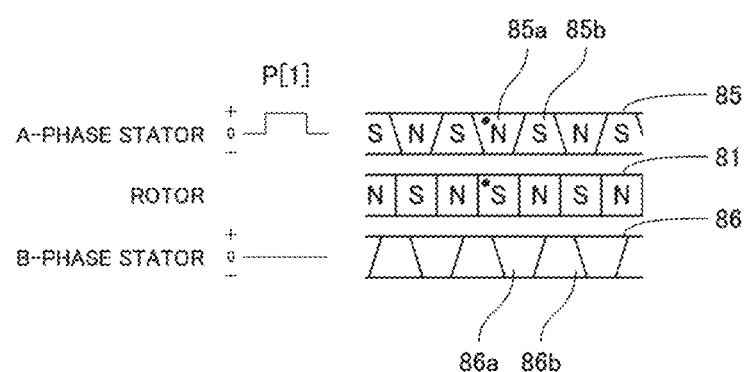

FIG.6
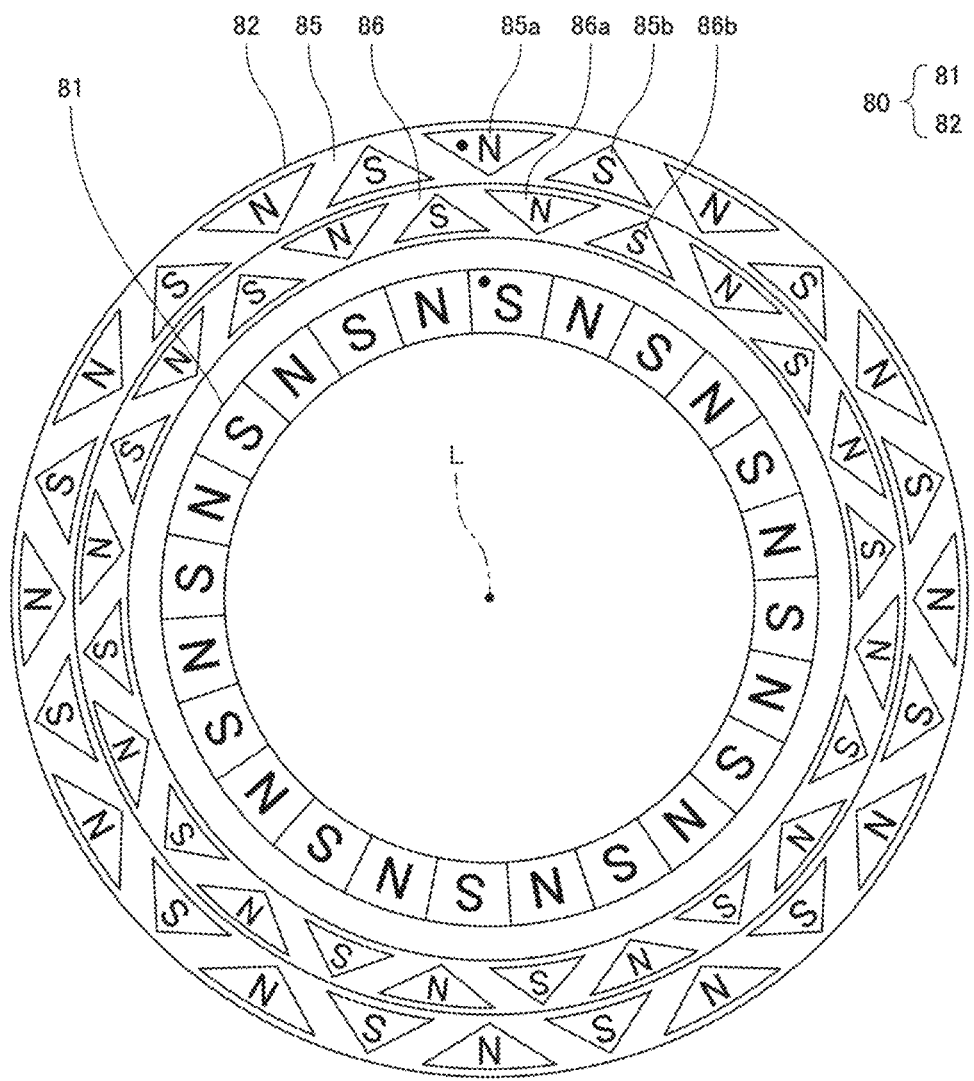
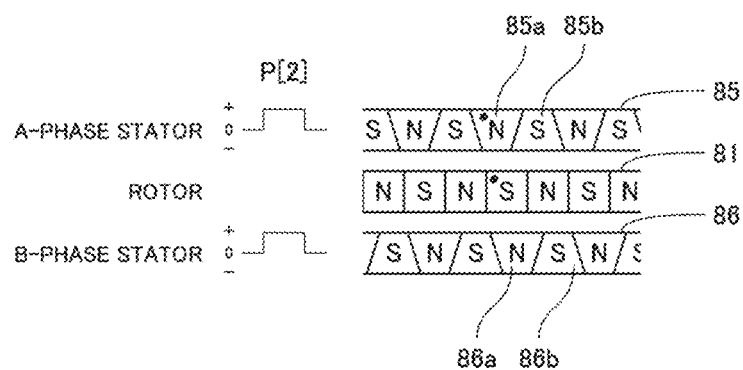

FIG.7
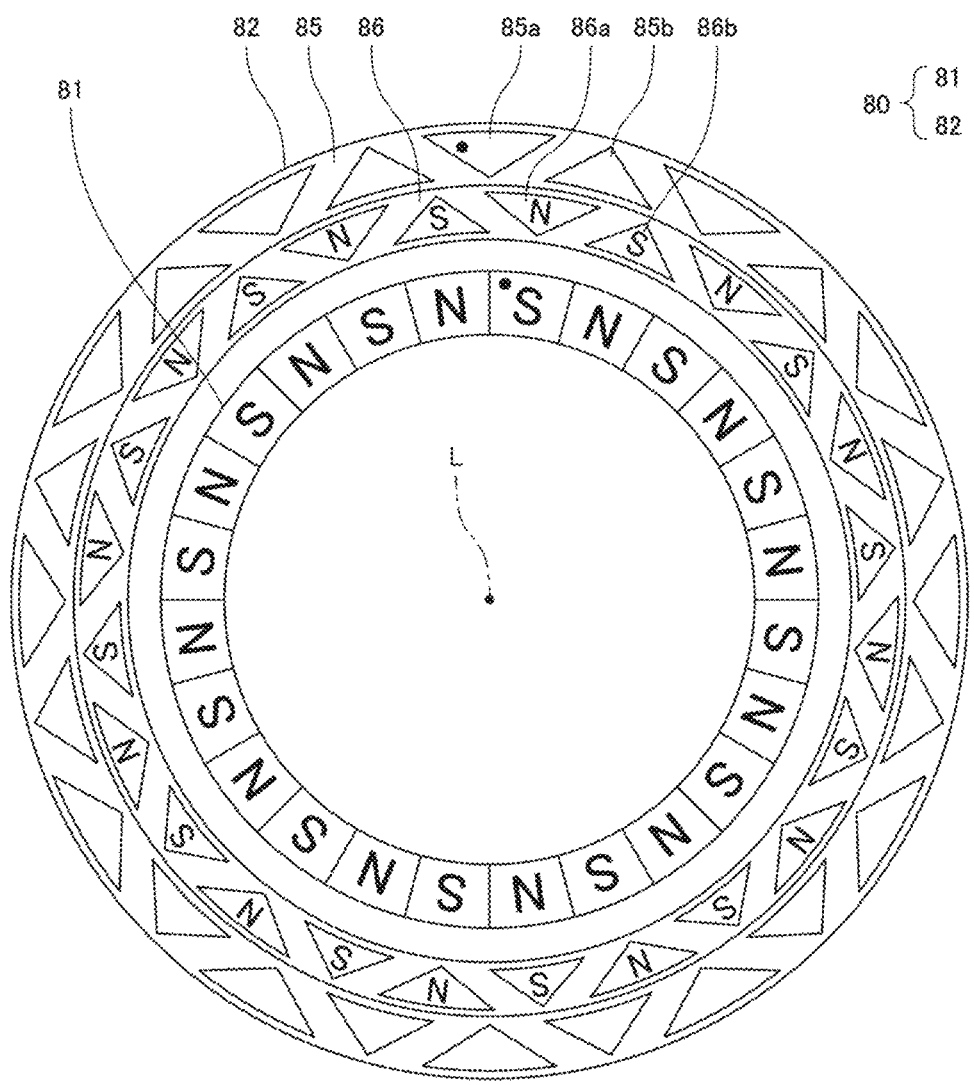
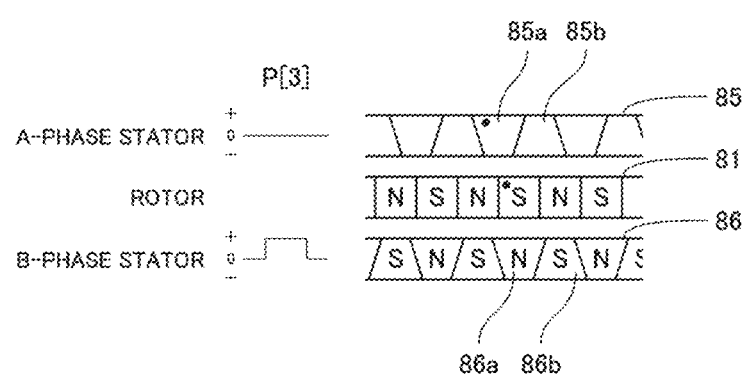

FIG.10
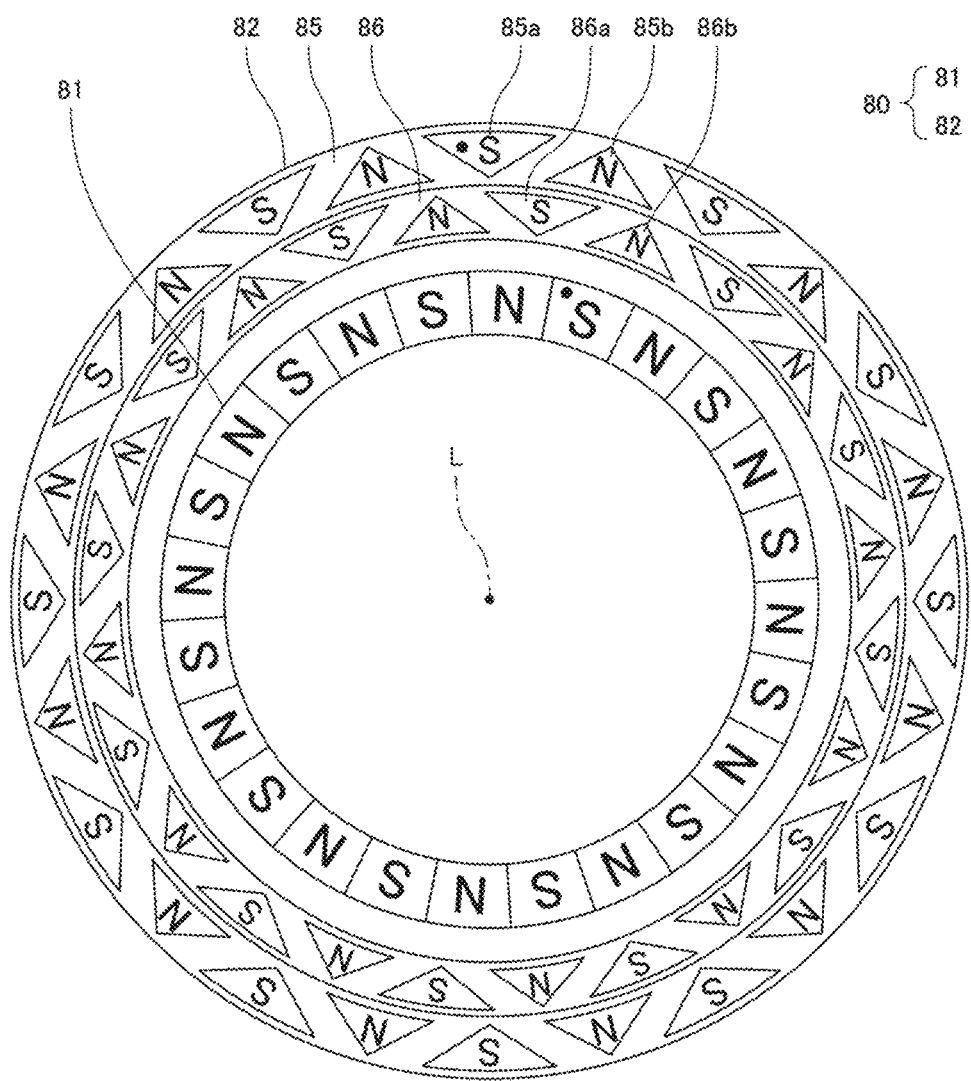
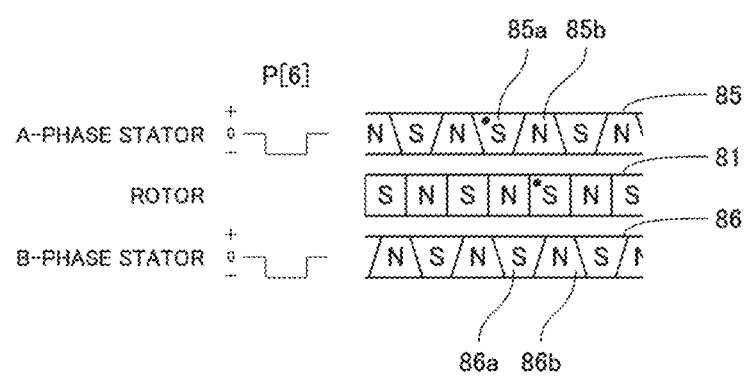

FIG.11
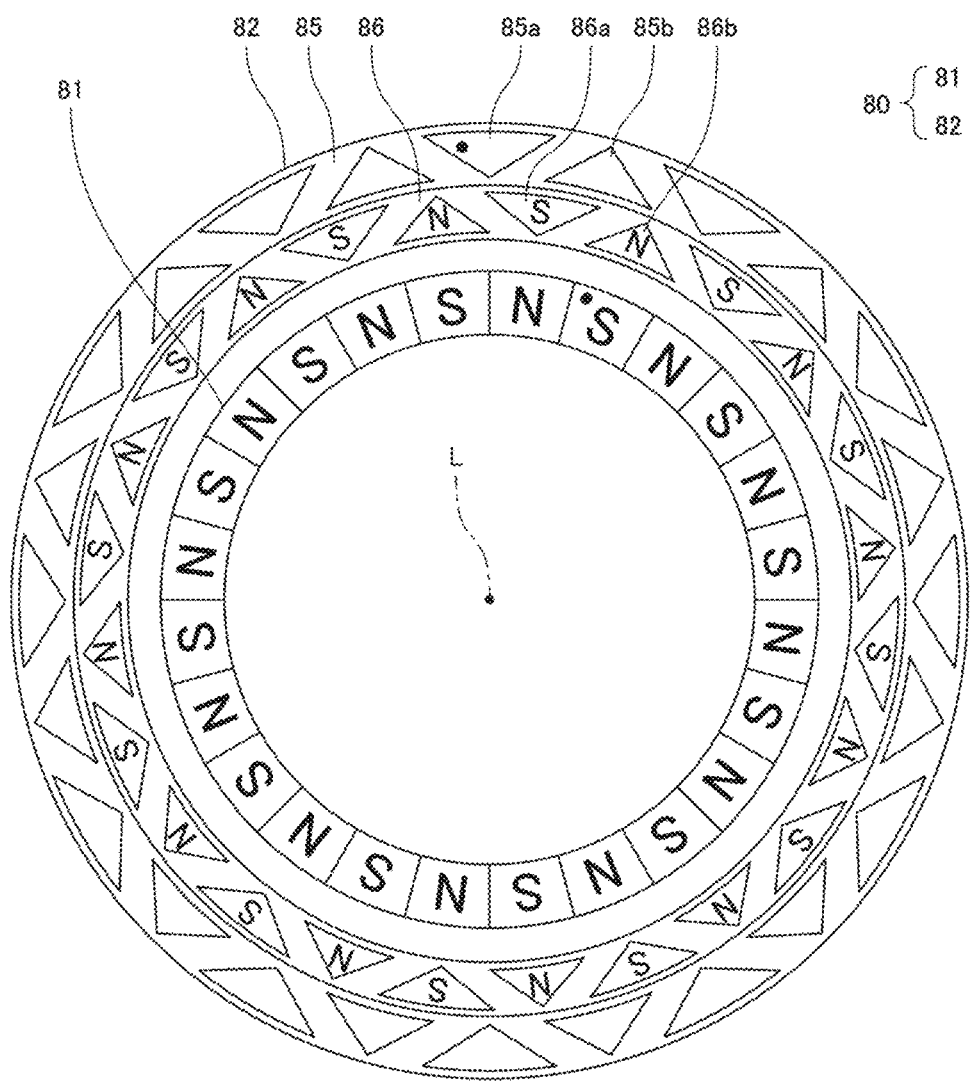
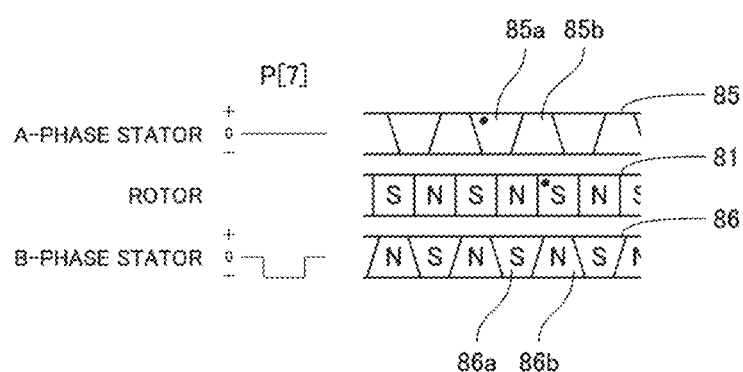

ELECTRIC VALVE CONTROL DEVICE, ELECTRIC VALVE DEVICE, AND METHOD FOR CONTROLLING ELECTRIC VALVE

CROSS REFERENCE TO RELATED APPLICATION

This Application is a 371 of PCT/JP2023/002780 filed on Jan. 30, 2023, which, in turn, claimed the priority of Japanese Patent Application No. 2022-020590 filed on Feb. 14, 2022, which is incorporated herein by reference.

TECHNICAL FIELD

The present invention relates to an electric valve control device, an electric valve device with the electric valve control device, and a method for controlling an electric valve.

BACKGROUND ART

Patent Literature 1 discloses an example of an electric valve according to the related art. The electric valve is installed in a refrigeration cycle system of an air conditioner. The electric valve includes a valve body, a valve member, and a stepping motor for moving the valve member. The stepping motor includes a rotor and a stator. The rotor rotates in response to pulses input to the stepping motor. The electric valve includes a movement mechanism to move the valve member along with the rotation of the rotor. The rotor rotates within a range from a reference position to a full-open position. When the rotor is at the reference position, a movable stopper mounted on the rotor is in contact with a fixed stopper mounted on the valve body, restricting the rotation of the rotor in a valve closing direction. When the rotor is at the full-open position, the valve member is positioned farthest from a valve port of the valve body.

The electric valve is controlled by an electric valve control device. In an initialization operation, the electric valve control device inputs pulses to the stepping motor to rotate the rotor in the valve closing direction and positions the rotor at the reference position. The number of the pulses input to the stepping motor is large enough to bring the movable stopper into contact with the fixed stopper. The number of the pulses is referred to as an initialization number. The initialization number is set to a number greater than the number of pulses in design input to the stepping motor when the rotor is rotated from the full-open position to the reference position. When the rotor rotates in the valve closing direction and the movable stopper comes into contact with the fixed stopper, the rotor is positioned at the reference position.

CITATION LIST

Patent Literature

Patent Literature 1: WO2019/130928

SUMMARY OF INVENTION

Technical Problem

In the initialization operation, the electric valve control device inputs pulses to the stepping motor until the number of pulses input to the stepping motor reaches the initialization number. However, if, for example, foreign matter in refrigerant enters the movement mechanism or the movement mechanism fails, the rotor may be stopped at a position between the reference position and the full-open position. Additionally, the movable and fixed stoppers wear due to repetitive contact. When the wear on the movable and fixed stoppers increases, the rotor may rotate in the valve closing direction far past the reference position and may be unable to be positioned at the reference position. As a result, the electric valve control device may start controlling the electric valve after the initialization operation even though the electric valve does not operate normally.

Accordingly, it is an object of the present invention to provide an electric valve control device, an electric valve device with the electric valve control device, and a method for controlling an electric valve that are capable of determining whether a rotor is able to rotate normally within an appropriate rotation range.

Solution to Problem

To achieve the object above, an electric valve control device according to one aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position.

A state where the rotation of the rotor in the first direction is restricted is a first-direction-rotation restricted state. A state where the rotation of the rotor in the second direction is restricted is a second-direction-rotation restricted state. The number of pulses in design input to the stepping motor when the rotor is rotated from the full-open position to the reference position is a design number.

(1) The electric valve control device is configured to input pulses to the stepping motor to rotate the rotor in the second direction.

(2) The electric valve control device is configured to input pulses to the stepping motor to rotate the rotor in the first direction when the electric valve is in the second-direction-rotation restricted state while the rotor is rotated in the second direction.

(3) The electric valve control device is configured to obtain the number of pulses, which is an input number, input to the stepping motor in a period from the second-direction-rotation restricted state to the first-direction-rotation restricted state when the electric valve is in the first-direction-rotation restricted state while the rotor is rotated in the first direction.

(4) The electric valve control device is configured to determine that the rotor is able to rotate normally when the input number is greater than or equal to the design number and is smaller than or equal to an upper limit number that is greater than the design number.

(5) The electric valve control device is configured to determine that the rotor is unable to rotate normally when the input number is smaller than the design number or is greater than the upper limit number.

To achieve the object above, an electric valve control device according to another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position.

A state where the rotation of the rotor in the first direction is restricted is a first-direction-rotation restricted state. A state where the rotation of the rotor in the second direction is restricted is a second-direction-rotation restricted state. The number of pulses in design input to the stepping motor when the rotor is rotated from the reference position to the full-open position is a design number.

(1) The electric valve control device is configured to input pulses to the stepping motor to rotate the rotor in the first direction.

(2) The electric valve control device is configured to input pulses to the stepping motor to rotate the rotor in the second direction when the electric valve is in the first-direction-rotation restricted state while the rotor is rotated in the first direction.

(3) The electric valve control device is configured to obtain the number of pulses, which is an input number, input to the stepping motor in a period from the first-direction-rotation restricted state to the second-direction-rotation restricted state when the electric valve is in the second-direction-rotation restricted state while the rotor is rotated in the second direction.

(4) The electric valve control device is configured to determine that the rotor is able to rotate normally when the input number is greater than or equal to the design number and is smaller than or equal to an upper limit number that is greater than the design number.

(5) The electric valve control device is configured to determine that the rotor is unable to rotate normally when the input number is smaller than the design number or is greater than the upper limit number.

In the present invention, preferably, the electric valve control device is configured to obtain a voltage generated in a stator of the stepping motor by rotation of the rotor. Preferably, the electric valve control device is configured to determine whether the electric valve is in the first-direction-rotation restricted state and whether the electric valve is in the second-direction-rotation restricted state, based on at least one of (i) an area of a waveform of the voltage, (ii) an amplitude of a wave periodically observed in the waveform of the voltage, and (iii) a periodic appearance of a new wave distinct from the wave periodically observed in the waveform of the voltage.

In the present invention, preferably, the stator includes an A-phase stator and a B-phase stator, and driving currents corresponding to pulses input to the stepping motor are supplied to the A-phase and B-phase stators.

Preferably, the electric valve control device is configured to obtain a voltage generated in one of the A-phase and B-phase stators when the driving current is supplied only to the other of the A-phase and B-phase stators.

To achieve the object above, an electric valve device according to still another aspect of the present invention is an electric valve device including the electric valve and the electric valve control device.

To achieve the object above, a method according to still another aspect of the present invention is a method for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position.

A state where the rotation of the rotor in the first direction is restricted is a first-direction-rotation restricted state. A state where the rotation of the rotor in the second direction is restricted is a second-direction-rotation restricted state. The number of pulses in design input to the stepping motor when the rotor is rotated from the full-open position to the reference position is a design number.

The method includes
(1) inputting pulses to the stepping motor to rotate the rotor in the second direction,
(2) inputting pulses to the stepping motor to rotate the rotor in the first direction when the electric valve is in the second-direction-rotation restricted state while the rotor is rotated in the second direction,
(3) obtaining the number of pulses, which is an input number, input to the stepping motor in a period from the second-direction-rotation restricted state to the first-direction-rotation restricted state when the electric valve is in the first-direction-rotation restricted state while the rotor is rotated in the first direction,
(4) determining that the rotor is able to rotate normally when the input number is greater than or equal to the design number and is smaller than or equal to an upper limit number that is greater than the design number, and
(5) determining that the rotor is unable to rotate normally when the input number is smaller than the design number or is greater than the upper limit number.

To achieve the object above, a method according to still another aspect of the present invention is a method for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position.

A state where the rotation of the rotor in the first direction is restricted is a first-direction-rotation restricted state. A state where the rotation of the rotor in the second direction is restricted is a second-direction-rotation restricted state. The number of pulses in design input to the stepping motor when the rotor is rotated from the reference position to the full-open position is a design number.

The method includes
(1) inputting pulses to the stepping motor to rotate the rotor in the first direction,
(2) inputting pulses to the stepping motor to rotate the rotor in the second direction when the electric valve is in the first-direction-rotation restricted state while the rotor is rotated in the first direction,
(3) obtaining the number of pulses, which is an input number, input to the stepping motor in a period from the first-direction-rotation restricted state to the second-direction-rotation restricted state when the electric valve is in the second-direction-rotation restricted state while the rotor is rotated in the second direction, (4) determining that the rotor is able to rotate normally when the input number is greater than or equal to the design number and is smaller than or equal to an upper limit number that is greater than the design number, and (5) determining that the rotor is unable to rotate normally when the input number is smaller than the design number or is greater than the upper limit number.

Advantageous Effects of Invention

According to the present invention, (1) the rotor of the electric valve is rotated in the second direction, (2) when the electric valve is in the second-direction-rotation restricted state, the rotor is rotated in the first direction, (3) when the electric valve is in the first-direction-rotation restricted state, the number of pulses (the input number) input to the stepping motor in the period from the second-direction-rotation restricted state to the first-direction-rotation restricted state is obtained, (4) when the input number is greater than or equal to the design number and is smaller than or equal to the upper limit number, it is determined that the rotor is able to rotate normally, and (5) when the input number is smaller than the design number or is greater than the upper limit number, it is determined that the rotor is unable to rotate normally.

According to the present invention, (1) the rotor of the electric valve is rotated in the first direction, (2) when the electric valve is in the first-direction-rotation restricted state, the rotor is rotated in the second direction, (3) when the electric valve is in the second-direction-rotation restricted state, the number of pulses (the input number) input to the stepping motor in the period from the first-direction-rotation restricted state to the second-direction-rotation restricted state is obtained, (4) when the input number is greater than or equal to the design number and is smaller than or equal to the upper limit number, it is determined that the rotor is able to rotate normally, and (5) when the input number is smaller than the design number or is greater than the upper limit number, it is determined that the rotor is unable to rotate normally.

If the rotor can rotate normally within a range from the reference position to the full-open position, the rotation of the rotor in the first direction is restricted (the first-direction-rotation restricted state) by the first stopper mechanism when the rotor is rotated in the first direction, and the rotation of the rotor in the second direction is restricted (the second-direction-rotation restricted state) by the second stopper mechanism when the rotor is rotated in the second direction. Additionally, the first and second stopper mechanisms wear due to restricting the rotation of the rotor. As the wear on the first stopper mechanism increases, the rotor can rotate in the first direction past the reference position. As the wear on the second stopper mechanism increases, the rotor can rotate in the second direction past the full-open position.

Consequently, when the rotor can rotate normally within an appropriate rotation range including the range from the reference position to the full-open position, the input number is greater than or equal to the design number and is smaller than or equal to the upper limit number that is greater than the design number. The upper limit number is set by considering the wear and based on the design number. Therefore, it is possible to determine whether the rotor is able to rotate normally within the appropriate rotation range by comparing the input number with the design number and the upper limit number.

BRIEF DESCRIPTION OF DRAWINGS

FIG. 5 is a diagram schematically illustrating a positional relationship between magnetic poles of the rotor and pole teeth of the stator (when pulse P[1] is input).

FIG. 6 is a diagram schematically illustrating the positional relationship between the magnetic poles of the rotor and the pole teeth of the stator (when pulse P[2] is input).

FIG. 7 is a diagram schematically illustrating the positional relationship between the magnetic poles of the rotor and the pole teeth of the stator (when pulse P[3] is input).

FIG. 10 is a diagram schematically illustrating the positional relationship between the magnetic poles of the rotor and the pole teeth of the stator (when pulse P[6] is input).

FIG. 11 is a diagram schematically illustrating the positional relationship between the magnetic poles of the rotor and the pole teeth of the stator (when pulse P[7] is input).

DESCRIPTION OF EMBODIMENTS

An electric valve device according to an embodiment of the present invention is described with reference to FIGS. 1 to 17. An electric valve device 1 according to the embodiment is used as, for example, a flow control valve for controlling the flow rate of refrigerant in a refrigeration cycle system of an air conditioner.

Figure 1:
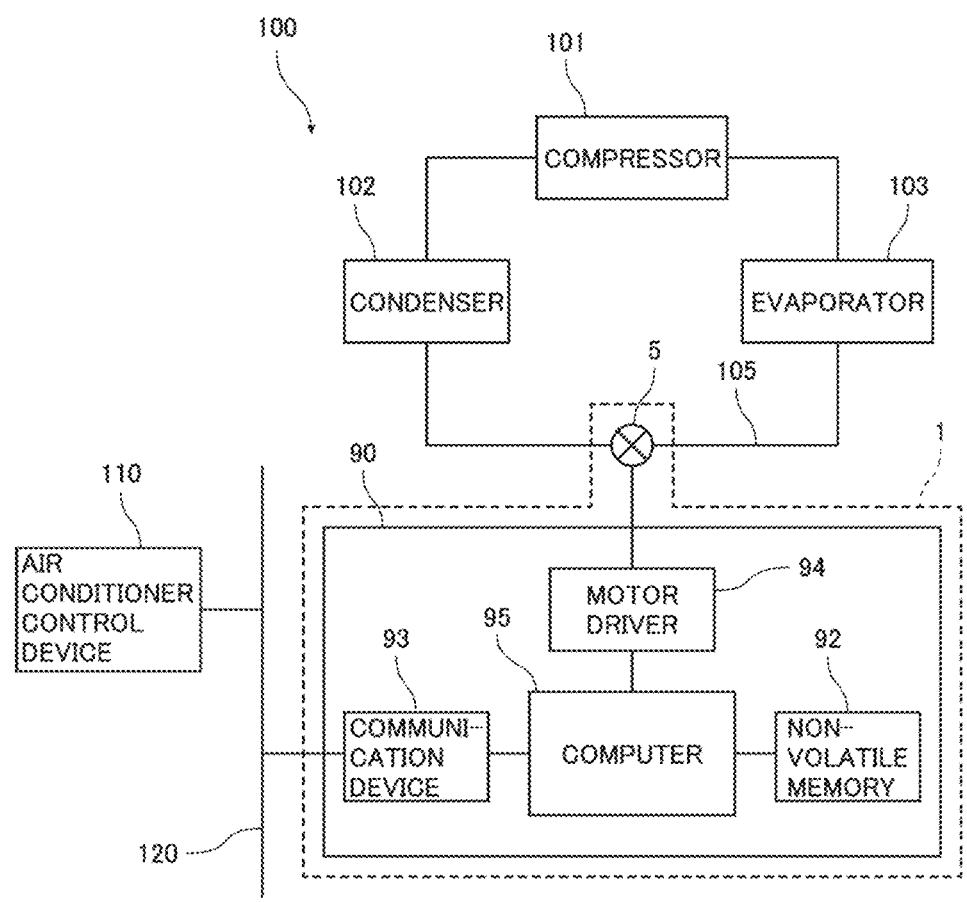
FIG. 1 is a block diagram of an air conditioning system including an electric valve device according to an embodiment of the present invention.
Figure 2:
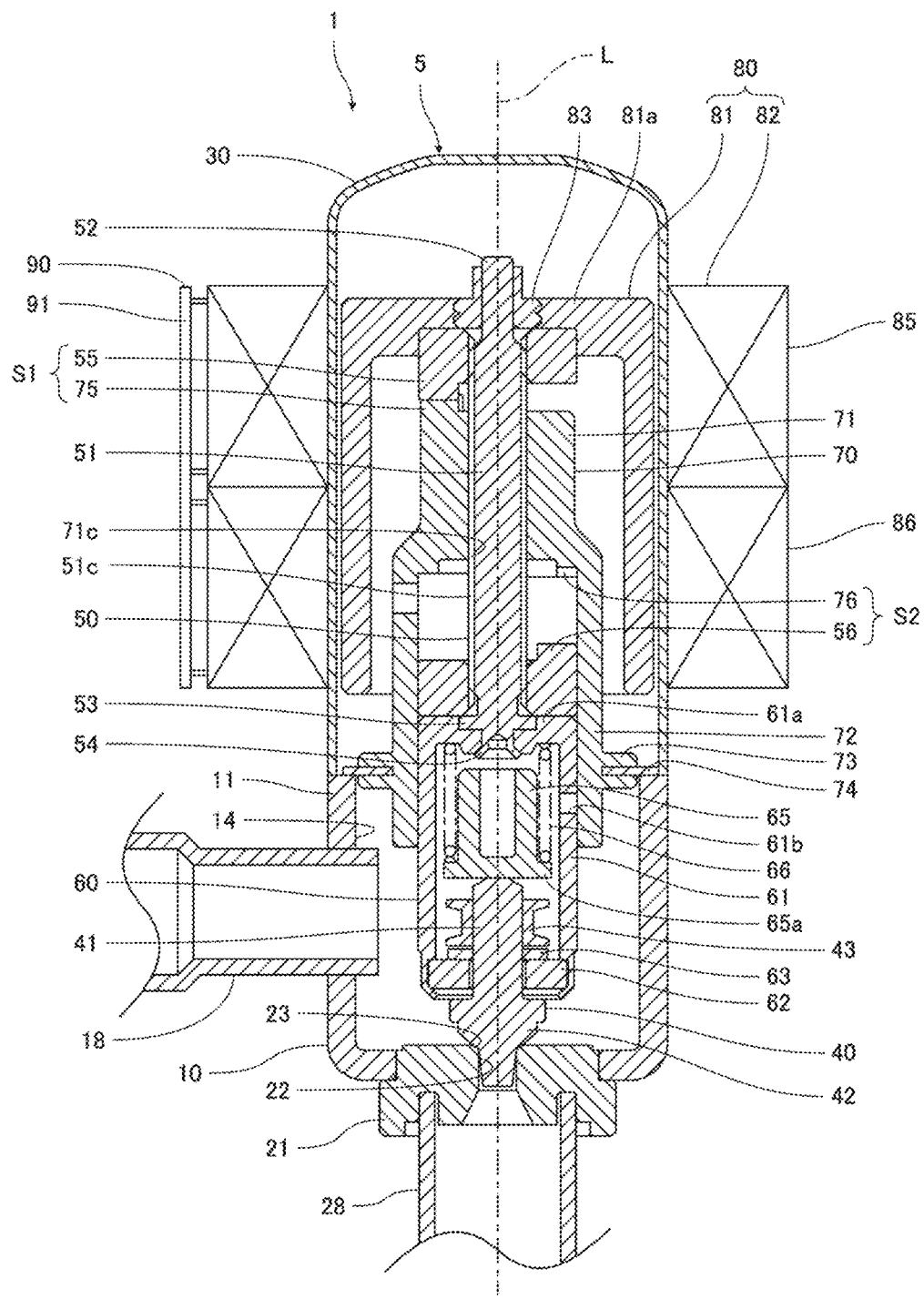
FIG. 2 is a sectional view of the electric valve device in FIG. 1.
Figure 3:
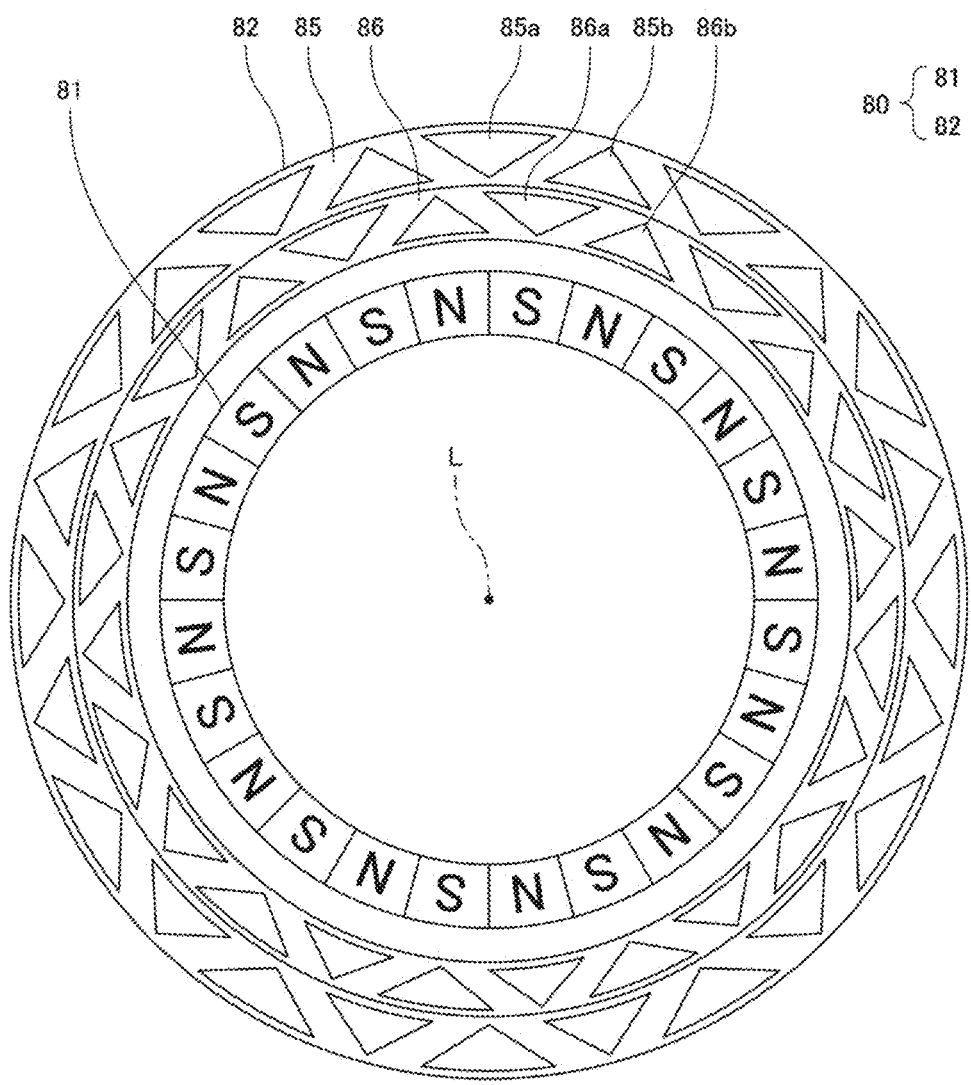
FIG. 3 is a diagram illustrating a rotor and a stator that are included in the electric valve device in FIG. 2.
Figures 4A, 4B:
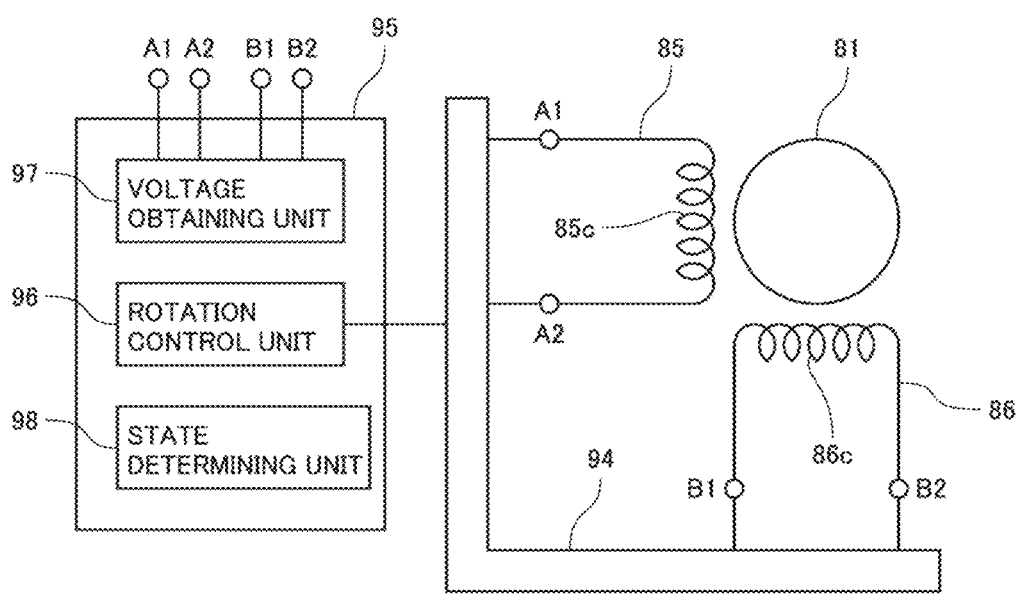
FIG. 4A is a diagram illustrating a computer, a motor driver, and a stepping motor that are included in the electric valve device in FIG. 2.
FIG. 4B shows an example of correspondence between pulses and driving currents supplied to a stator by the motor driver.
Figure 8:
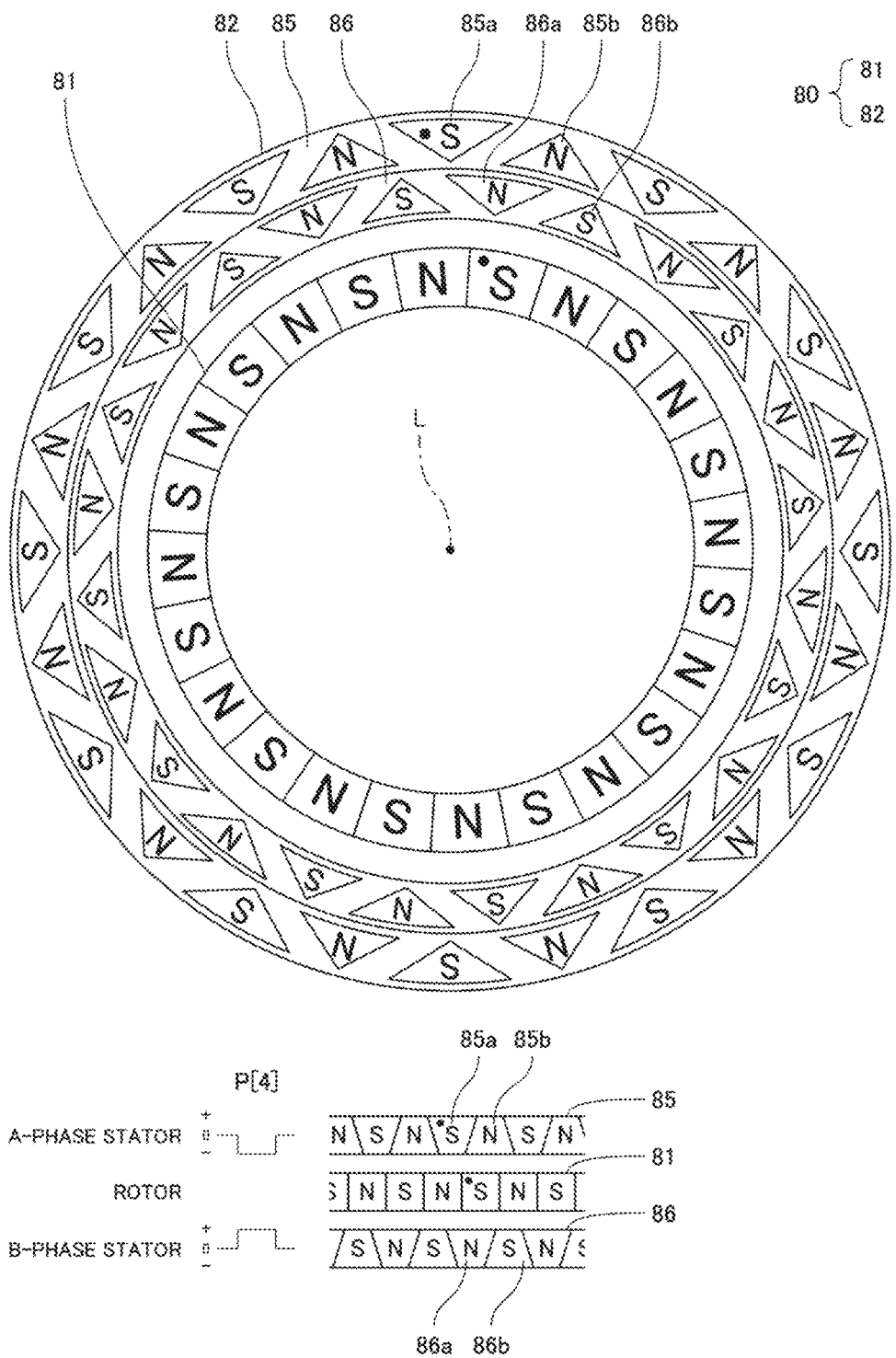
FIG. 8 is a diagram schematically illustrating the positional relationship between the magnetic poles of the rotor and the pole teeth of the stator (when pulse P[4] is input).
Figure 9:
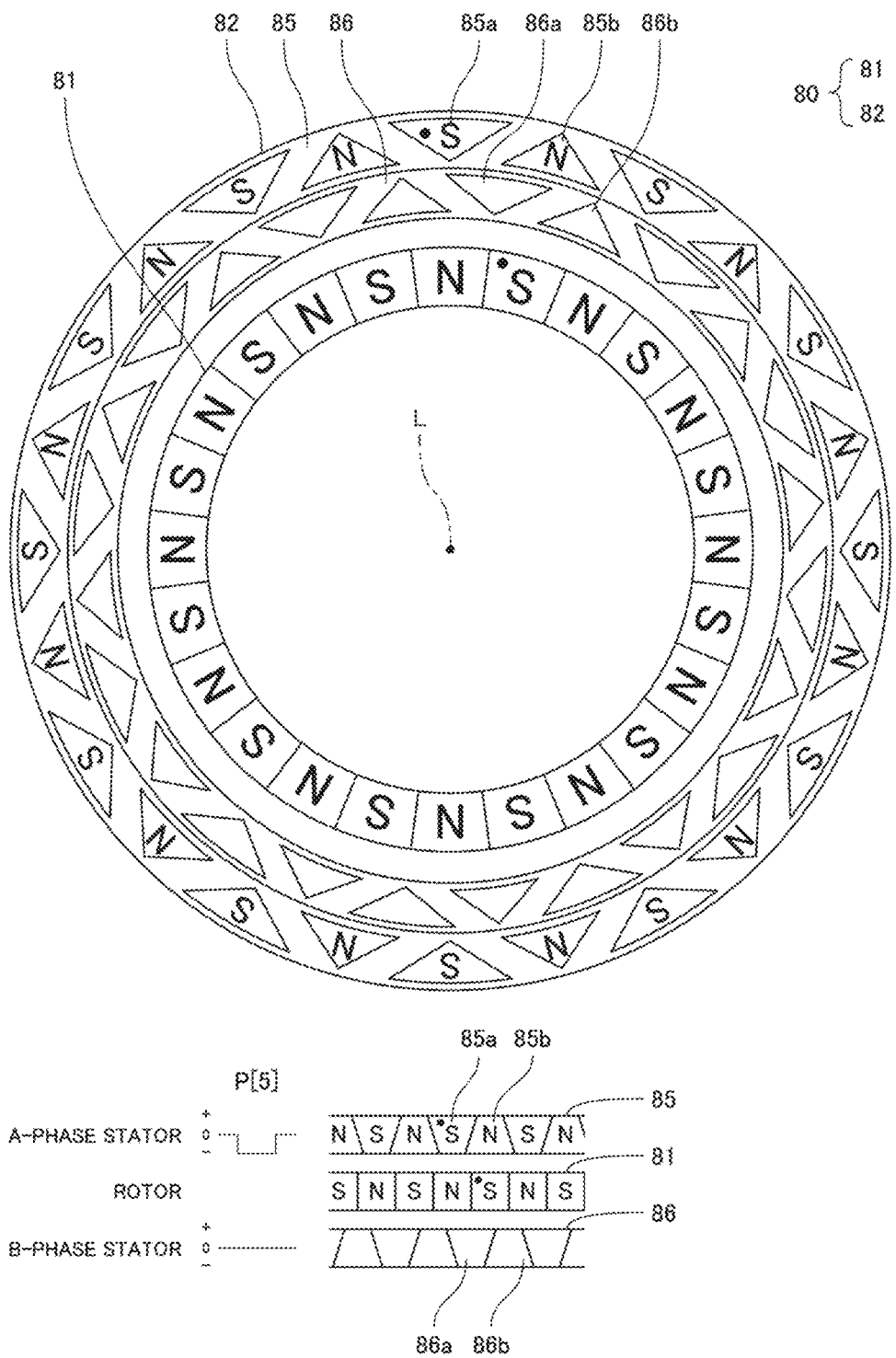
FIG. 9 is a diagram schematically illustrating the positional relationship between the magnetic poles of the rotor and the pole teeth of the stator (when pulse P[5] is input).
Figure 12:
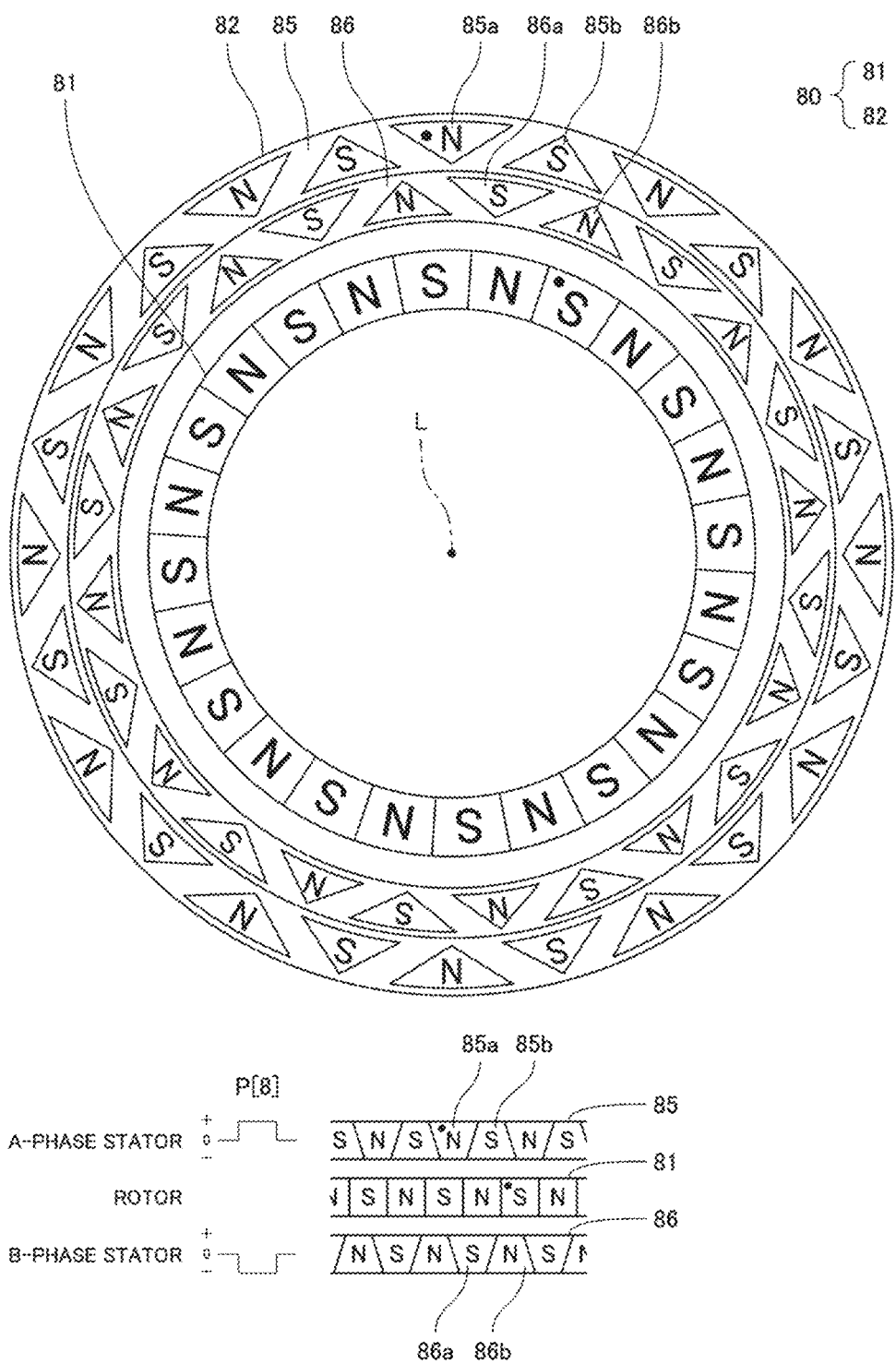
FIG. 12 is a diagram schematically illustrating the positional relationship between the magnetic poles of the rotor and the pole teeth of the stator (when pulse P[8] is input).
Figure 13:
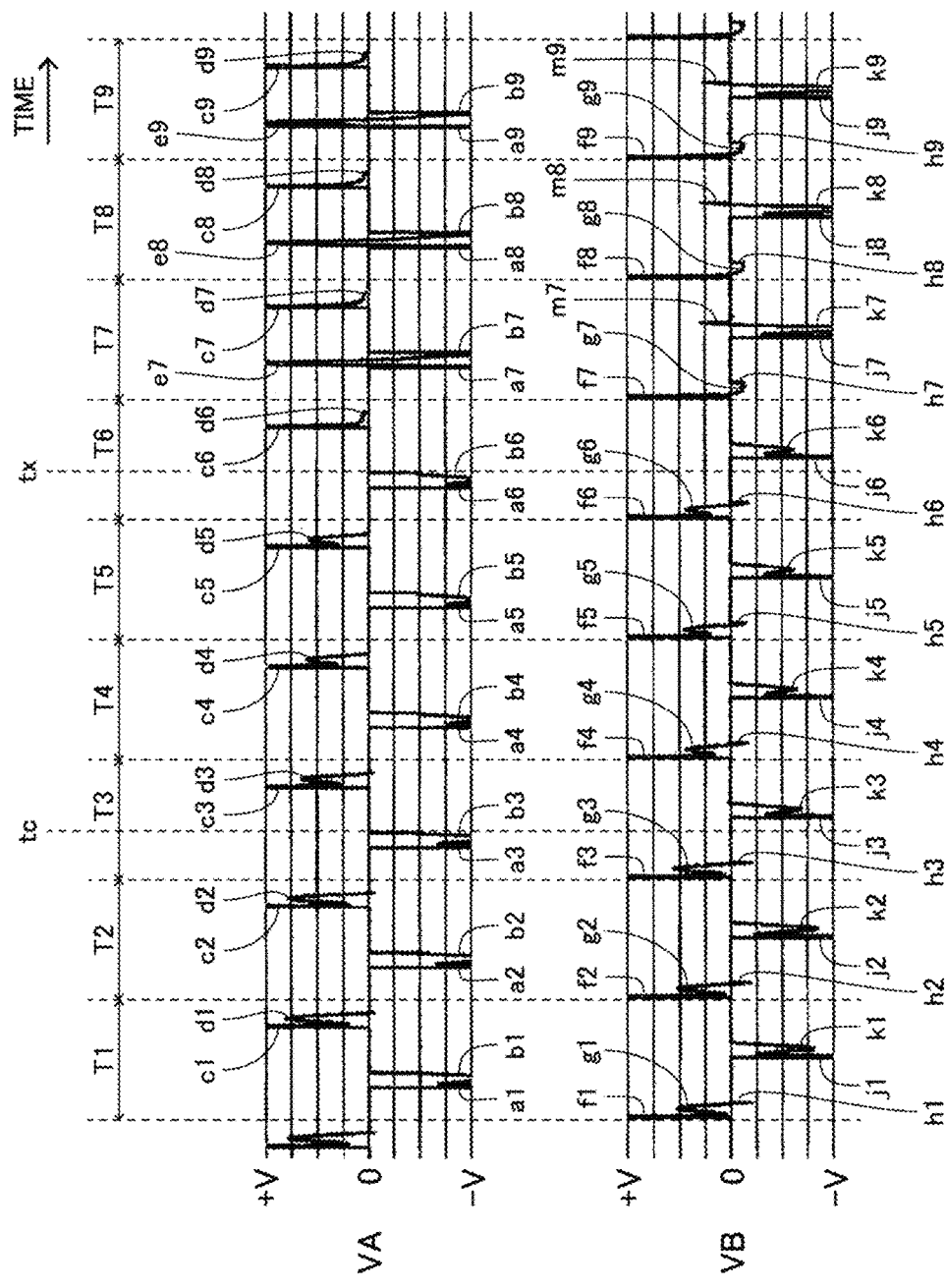
FIG. 13 is a diagram showing an example of a waveform of a voltage generated in the stator by rotation of the rotor in an initialization operation of the electric valve device.
Figure 14:
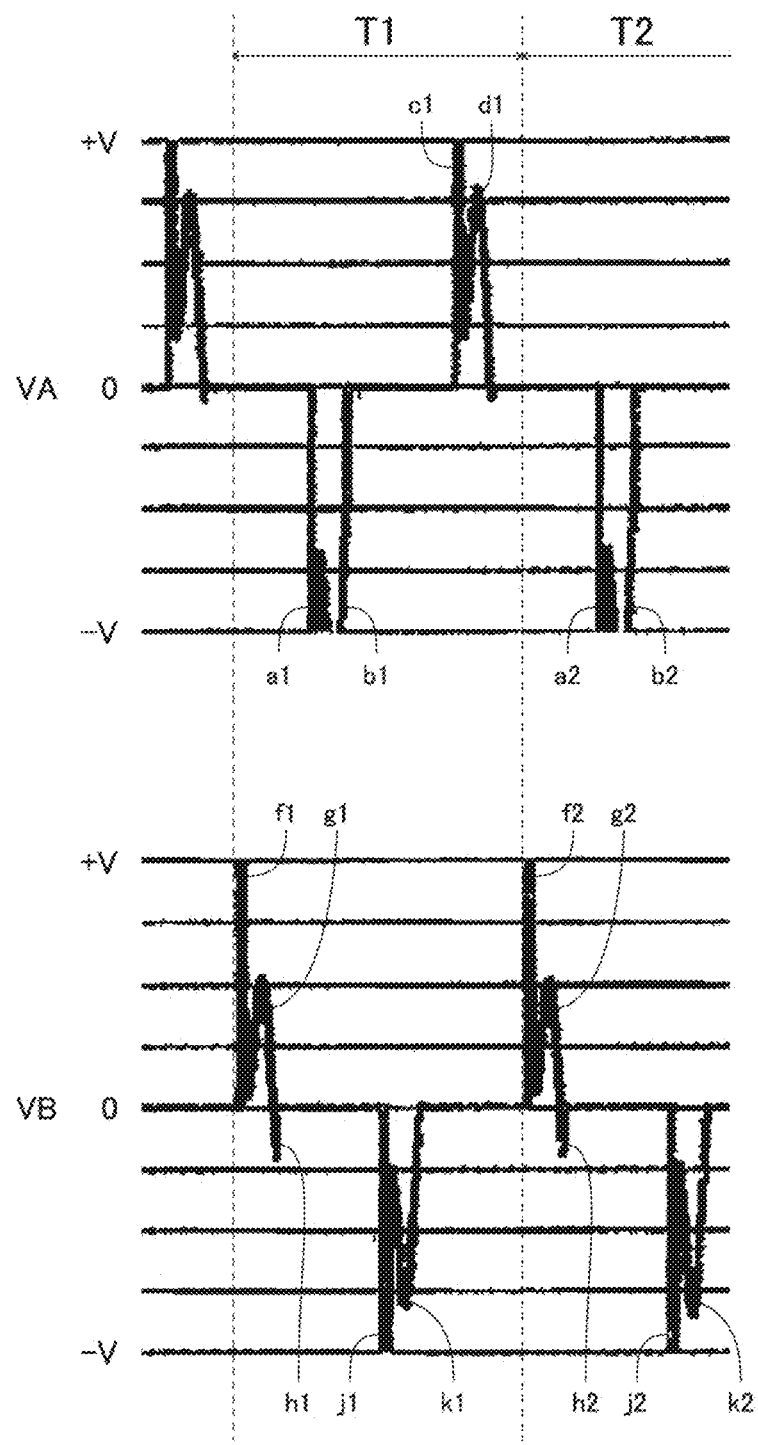
FIG. 14 is an enlarged view of a part of the waveform of the voltage in FIG. 13.
Figure 15:
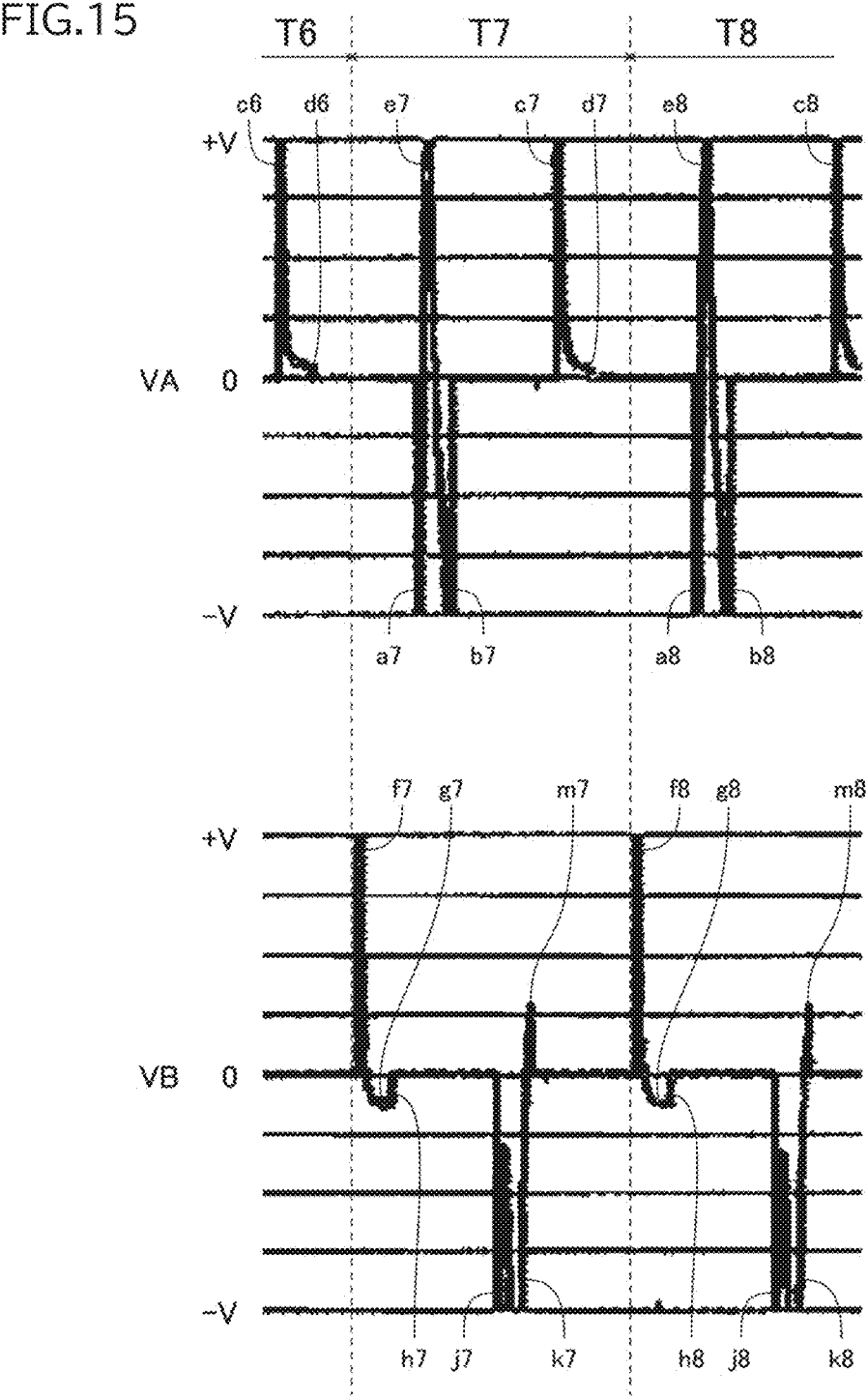
FIG. 15 is an enlarged view of another part of the waveform of the voltage in FIG. 13.
Figure 16:
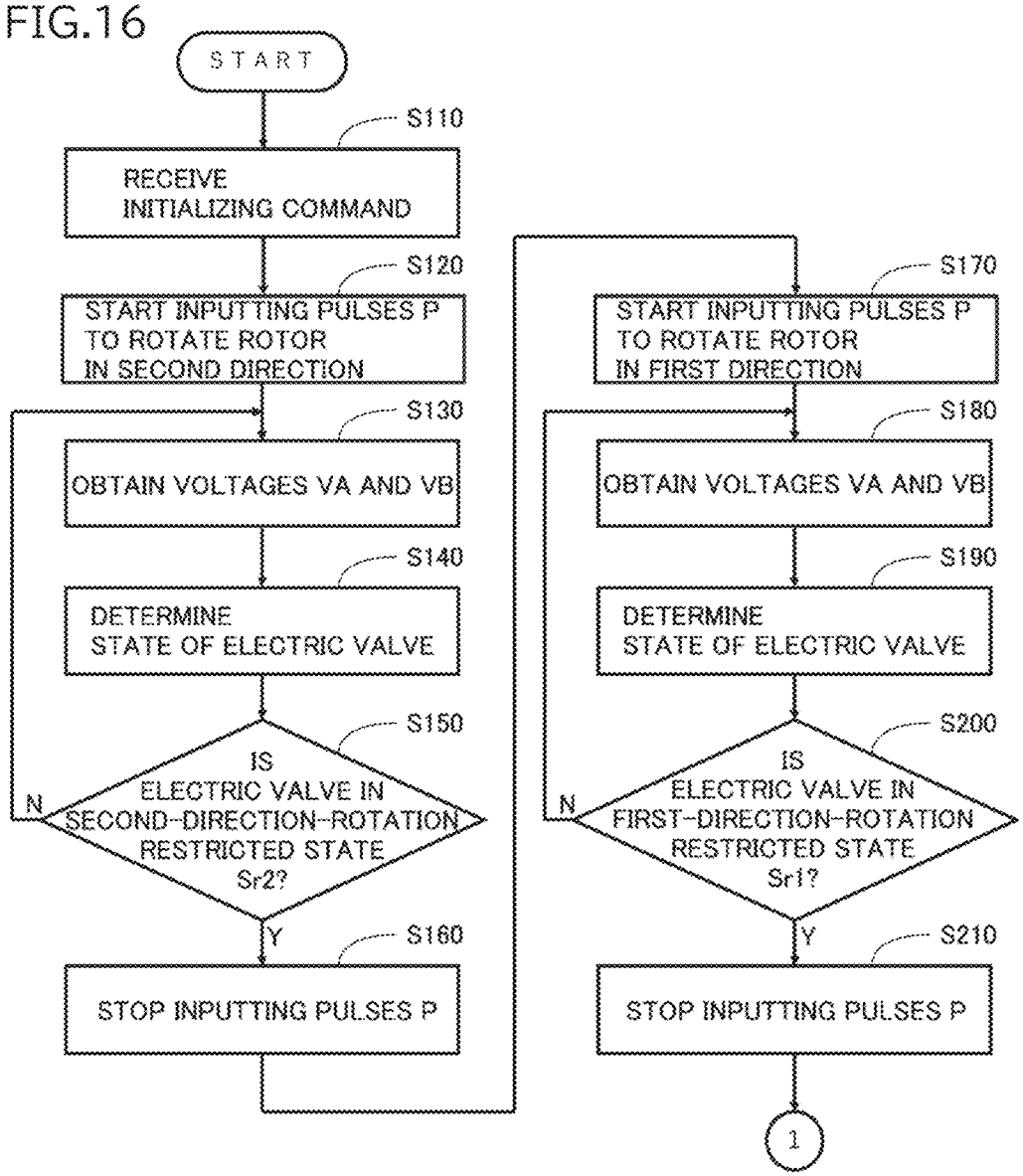
FIG. 16 is a flowchart illustrating an example of the initialization operation performed by the computer included in the electric valve device in FIG. 2.
Figure 17:
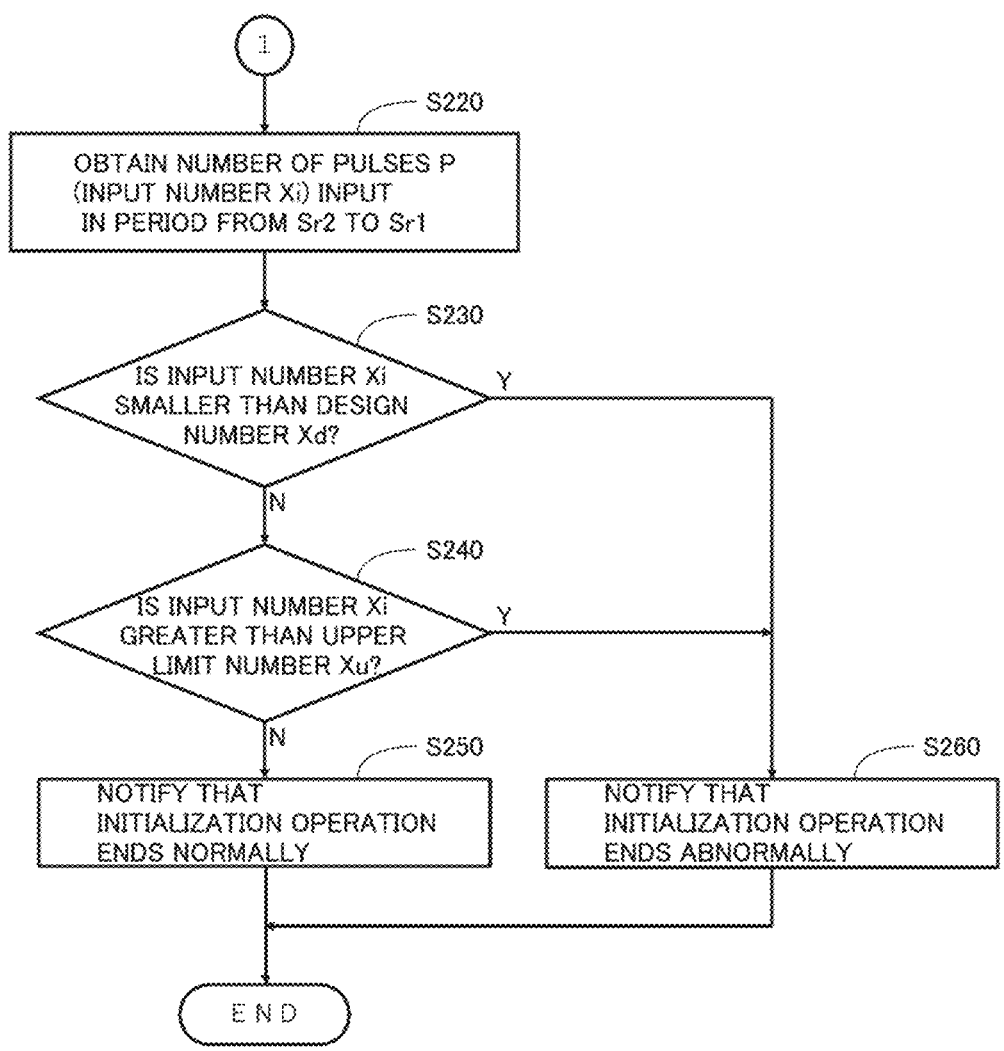
FIG. 17 is a flowchart illustrating the example of the initialization operation performed by the computer included in the electric valve device in FIG. 2 (following the flowchart in FIG. 16).

FIG. 1 is a block diagram of an air conditioning system including the electric valve device according to the embodiment of the present invention. FIG. 2 is a sectional view of the electric valve device in FIG. 1. FIG. 3 is a diagram illustrating a rotor and a stator that are included in the electric valve device in FIG. 2. FIG. 3 schematically illustrates the rotor and the stator. FIG. 4 is a diagram illustrating a computer, a motor driver, and a stepping motor (the rotor and the stator) that are included in the electric valve device in FIG. 2. FIG. 4A schematically illustrates connections among the computer and the motor driver that are included in an electric valve control device, and the stepping motor. FIG. 4B shows an example of correspondence between pulses and driving currents supplied to the stator by the motor driver. FIGS. 5 to 12 are diagrams schematically illustrating positional relationships between magnetic poles of the rotor and pole teeth of the stator. FIGS. 5 to 12 correspond to when pulses P[1] to P[8] are input. FIGS. 5 to 12 schematically illustrate the rotor and the stator. FIG. 13 is a diagram showing an example of a waveform of a voltage generated in the stator by rotation of the rotor in an initialization operation of the electric valve device. FIG. 14 is an enlarged view of a part (in time period T1) of the waveform of the voltage in FIG. 13. FIG. 15 is an enlarged view of another part (in time period T7) of the waveform of the voltage in FIG. 13. FIGS. 16 and 17 are flowcharts illustrating an example of the initialization operation performed by the computer included in the electric valve device in FIG. 2.

FIG. 1 illustrates an example of an air conditioning system 100 mounted in a vehicle. The air conditioning system 100 includes a compressor 101, a condenser 102, the electric valve device 1 (an electric valve 5), and an evaporator 103, which are connected in this order by a pipe 105. The electric valve device 1 functions as an expansion valve. The air conditioning system 100 includes an air conditioner control device 110. The air conditioner control device 110 is connected to the electric valve device 1 and can communicate with the electric valve device 1. The air conditioner control device 110 uses the electric valve device 1 to control the flow rate of refrigerant flowing through the pipe 105.

As illustrated in FIG. 2, the electric valve device 1 includes the electric valve 5 and an electric valve control device 90.

As illustrated in the figures, the electric valve 5 includes a valve body 10, a can 30, a valve member 40, a valve stem 50, a coupling mechanism 60, a guide stem member 70, and a stepping motor 80.

The valve body 10 includes a body member 11 and a valve seat member 21. The body member 11 has a circular cylindrical shape. The valve seat member 21 has a disc shape. The valve seat member 21 is bonded to the lower end of the body member 11. The valve seat member 21 has a valve port 22 and a valve seat 23. The valve port 22 is a circular hole extending through the center of the valve seat member 21 in an up-and-down direction (a direction of an axis L). The valve seat 23 is a circular annular tapered surface provided on the upper surface of the valve seat member 21. The valve seat 23 encloses the valve port 22.

The valve body 10 has a valve chamber 14. A first conduit 18 is brazed to the body member 11. The first conduit 18 extends through the body member 11 in a lateral direction (a left-and-right direction in FIG. 2). The first conduit 18 is connected to the valve chamber 14. A second conduit 28 is brazed to the valve seat member 21. The second conduit 28 is disposed in the up-and-down direction. The second conduit 28 is connected to the valve port 22.

The can 30 has a circular cylindrical shape. The can 30 is open at the lower end and is closed at the upper end. The outer diameter of the can 30 is equal to that of the body member 11. The inner diameter of the can 30 is larger than that of the body member 11. The can 30 is mounted on the upper end surface of the body member 11. Specifically, the lower end of the can 30 is welded to the outer peripheral edge of the upper end surface of the body member 11.

The valve member 40 includes a stem portion 41, a valve portion 42, and a sleeve 43. The stem portion 41 has a circular columnar shape. The valve portion 42 has a conical shape with the tip end pointing downward. The valve portion 42 is provided coaxially and continuously with the lower end of the stem portion 41. The sleeve 43 has a circular cylindrical shape. The stem portion 41 extends through the sleeve 43. The sleeve 43 is secured to the stem portion 41.

The valve member 40 is disposed in the valve chamber 14. The valve member 40 faces the valve port 22 in the up-and-down direction. The valve portion 42 comes into contact with the valve seat 23 and moves away from the valve seat 23. When the valve portion 42 moves away from the valve seat 23, the valve port 22 is open, and the electric valve 5 is in a valve opening state. In the valve opening state, the first conduit 18 is connected to the second conduit 28 through the valve chamber 14. When the valve portion 42 comes into contact with the valve seat 23, the valve port 22 is closed, and the electric valve 5 is in a valve closing state. In the valve closing state, the first conduit 18 is separated from the second conduit 28.

The valve stem 50 includes a first part 51, a second part 52, and a third part 53. The first part 51 has a circular columnar shape. The first part 51 includes an external thread 51c on the outer circumferential surface. The second part 52 has a circular columnar shape. The outer diameter of the second part 52 is smaller than that of the first part 51. The second part 52 is provided coaxially and continuously with the upper end of the first part 51. The third part 53 has a disc shape. The outer diameter of the third part 53 is larger than that of the first part 51. The third part 53 is provided coaxially and continuously with the lower end of the first part 51.

An upper stopper member 55 is mounted on the upper end of the first part 51. A lower stopper member 56 is mounted on the lower end of the first part 51.

The coupling mechanism 60 combines the valve member 40 with the valve stem 50. The coupling mechanism 60 includes a holder 61, a valve-member supporting member 62, a spacer 63, a spring receiving member 65, and a valve closing spring 66.

The holder 61 has a circular cylindrical shape. The holder 61 is open at the lower end and is closed at the upper end. The holder 61 is fixed to the third part 53 of the valve stem 50. Specifically, the valve stem 50 includes a fixing portion 54 that has a circular cylindrical shape extending downward from the lower surface of the third part 53, and the fixing portion 54 is inserted into a through hole provided in an upper wall portion 61a of the holder 61 and is then expanded in diameter. This causes the upper wall portion 61a to be held by the third part 53 and the fixing portion 54. The inner space of the holder 61 is connected to the valve chamber 14 through a pressure equalizing hole 61b.

The valve-member supporting member 62 has a circular annular plate-like shape. The lower end of the holder 61 is crimped to hold the outer peripheral edge of the valve-member supporting member 62. The spacer 63 has a circular annular plate-like shape. The spacer 63 is disposed on the upper surface of the valve-member supporting member 62. The stem portion 41 of the valve member 40 extends through the valve-member supporting member 62 and the spacer 63. The sleeve 43 of the valve member 40 inhibits the stem portion 41 from coming off the valve-member supporting member 62. The valve-member supporting member 62 supports the valve member 40 movably in up-and-down direction.

The spring receiving member 65 has a circular cylindrical shape. The spring receiving member 65 includes a flange 65a projecting radially outward at the lower end. The spring receiving member 65 is disposed inside the holder 61 movably in up-and-down direction. The lower surface of the spring receiving member 65 is in contact with the upper end of the stem portion 41 of the valve member 40.

The valve closing spring 66 is a compression coil spring. The valve closing spring 66 is disposed between the upper wall portion 61a of the holder 61 and the flange 65a of the spring receiving member 65. The valve closing spring 66 presses the spring receiving member 65 to the stem portion 41 of the valve member 40. The valve closing spring 66 pushes the valve member 40 downward via the spring receiving member 65.

The valve member 40 may be connected directly to the valve stem 50 without the coupling mechanism 60.

The guide stem member 70 includes a circular columnar portion 71, a circular cylindrical portion 72, a holding portion 73, and a circular plate 74.

The circular columnar portion 71 includes an upper stopper portion 75 at the upper end. The circular columnar portion 71 includes a lower stopper portion 76 at the lower end. The circular columnar portion 71 includes an internal thread 71c extending through the center of the circular columnar portion 71 in the up-and-down direction. The external thread 51c of the valve stem 50 is screwed into the internal thread 71c.

The circular cylindrical portion 72 is provided continuously with the lower end of the circular columnar portion 71. The third part 53 of the valve stem 50, the lower stopper member 56, and the coupling mechanism 60 are disposed inside the circular cylindrical portion 72. The inner diameter of the circular cylindrical portion 72 is equal to the outer diameter of the holder 61. The circular cylindrical portion 72 supports the holder 61 movably in the up-and-down direction.

The holding portion 73 is an annular projection. The holding portion 73 projects radially outward from the outer circumferential surface of the circular cylindrical portion 72. The circular plate 74 has an annular shape. The inner peripheral edge of the circular plate 74 is embedded in the holding portion 73. The outer peripheral edge of the circular plate 74 is welded to the inner peripheral edge of the upper end surface of the body member 11. The guide stem member 70 is fixed to the valve body 10.

The stepping motor 80 includes a rotor 81 and a stator 82.

The rotor 81 has a circular cylindrical shape. The rotor 81 is open at the lower end and is closed at the upper end. The rotor 81 has a plurality of north (N) poles and a plurality of south(S) poles. The N poles and the S poles are disposed on the outer circumferential surface of the rotor 81. The N poles and the S poles each extend in the up-and-down direction. As illustrated in FIG. 3, the N poles and the S poles are alternately arranged at regular angular intervals in the circumferential direction. The rotor 81 has, for example, twelve N poles and twelve S poles. The angle between the N pole and the S pole adjacent to each other is 15 degrees.

The rotor 81 is disposed rotatably inside the can 30. The rotor 81 includes an upper wall portion 81a combined with the second part 52 of the valve stem 50 via a coupling element 83. The valve stem 50 rotates together with the rotor 81. When the valve stem 50 rotates, the screw-feed action of the external thread 51c of the valve stem 50 and the internal thread 71c of the guide stem member 70 moves the valve stem 50, the coupling mechanism 60, and the valve member 40 in the up-and-down direction. The valve stem 50 and the guide stem member 70 are members of a movement mechanism to move the valve member 40 along with the rotation of the rotor 81.

The stator 82 has a circular cylindrical shape. The stator 82 is disposed outside the can 30. The stator 82 includes an A-phase stator 85 and a B-phase stator 86.

The A-phase stator 85 includes a plurality of claw-pole type pole teeth 85a and 85b in the inner circumference. In FIG. 3, the radially outward direction in the A-phase stator 85 corresponds to upward, and the radially inward direction corresponds to downward. The tip ends of the pole teeth 85a point downward, and the tip ends of the pole teeth 85b point upward. The pole teeth 85a and the pole teeth 85b are alternately arranged at regular angular intervals in the circumferential direction. The A-phase stator 85 has, for example, twelve pole teeth 85a and twelve pole teeth 85b. The angle between the pole tooth 85a and the pole tooth 85b adjacent to each other is 15 degrees. When a coil 85c of the A-phase stator 85 is energized, the pole teeth 85a and the pole teeth 85b have opposite polarities.

The B-phase stator 86 includes a plurality of claw-pole type pole teeth 86a and 86b in the inner circumference. In FIG. 3, the radially outward direction in the B-phase stator 86 corresponds to upward, and the radially inward direction corresponds to downward. The tip ends of the pole teeth 86a point downward, and the tip ends of the pole teeth 86b point upward. The pole teeth 86a and the pole teeth 86b are alternately arranged at regular angular intervals in the circumferential direction. The B-phase stator 86 has, for example, twelve pole teeth 86a and twelve pole teeth 86b. The angle between the pole tooth 86a and the pole tooth 86b adjacent to each other is 15 degrees. When a coil 86c of the B-phase stator 86 is energized, the pole teeth 86a and the pole teeth 86b have opposite polarities.

The A-phase stator 85 is disposed coaxially on the B-phase stator 86. The A-phase stator 85 is in contact with the B-phase stator 86. When viewed in the direction of the axis L, the angle between the pole tooth 85a of the A-phase stator 85 and the pole tooth 86a of the B-phase stator 86 adjacent to each other is 7.5 degrees. In other words, the B-phase stator 86 is in a position where the B-phase stator 86 is rotated relatively to the A-phase stator 85 about the axis L by 7.5 degrees from a position where the pole tooth 85a and the pole tooth 86a are arranged in the direction of the axis L. As illustrated in FIG. 4A, terminals A1 and A2 of the coil 85c of the A-phase stator 85 and terminals B1 and B2 of the coil 86c of the B-phase stator 86 are connected to a motor driver 94 of the electric valve control device 90.

The rotor 81 is rotated by pulses P (pulses P[1] to P[8]) input to the stepping motor 80. Specifically, the rotor 81 is rotated by driving currents, corresponding to pulses P, supplied to the stator 82 of the stepping motor 80. In this specification, "inputting pulses P to the stepping motor 80" is synonymous with "supplying driving currents corresponding to pulses P to the stator 82 of the stepping motor 80".

Pulses P[1] to P[8] illustrated in FIG. 4B are input to the stepping motor 80 in order. FIGS. 5 to 12 illustrate examples of positional relationships between the rotor 81 and the stator 82 when pulses P[1] to P[8] are input. In FIGS. 5 to 12, the reference pole tooth 85a and the reference magnetic pole (S pole) of the rotor 81 are marked with a dot for easy understanding of the positional relationship between the rotor 81 and the stator 82 (the A-phase stator 85 and the B-phase stator 86).

In rotating the rotor 81 in a first direction (clockwise in FIGS. 5 to 12), pulses P are cyclically input to the stepping motor 80 in ascending order (in the order from pulse P[1] to pulse P[8]). The valve stem 50 is rotated in the first direction together with the rotor 81. The screw-feed action of the external thread 51c of the valve stem 50 and the internal thread 71c of the guide stem member 70 moves the valve stem 50 downward. The coupling mechanism 60 and the valve member 40 move downward together with the valve stem 50. The valve member 40 comes into contact with the valve seat 23, and the valve port 22 is closed (the valve closing state). At this time, the rotor 81 is at a valve closing position Rc. When the rotor 81 is further rotated in the first direction, the valve closing spring 66 is compressed, and the coupling mechanism 60 (the holder 61 and the valve-member supporting member 62) further moves downward together with the valve stem 50. The valve member 40 does not move downward. When the upper stopper member 55 comes into contact with the upper stopper portion 75 of the guide stem member 70, the rotation of the rotor 81 in the first direction is restricted. At this time, the rotor 81 is at a reference position Rx. The upper stopper member 55 and the upper stopper portion 75 are members of a first stopper mechanism S1 that restricts the rotation of the rotor 81 in the first direction.

In rotating the rotor 81 in a second direction (counter-clockwise in FIGS. 5 to 12), pulses P are cyclically input to the stepping motor 80 in descending order (in the order from pulse P[8] to pulse P[1]). The valve stem 50 is rotated in the second direction together with the rotor 81. The screw-feed action of the external thread 51c of the valve stem 50 and the internal thread 71c of the guide stem member 70 moves the valve stem 50 upward. The coupling mechanism 60 (the holder 61 and the valve-member supporting member 62) moves upward together with the valve stem 50. The valve member 40 moves upward together with the valve-member supporting member 62, the valve member 40 moves away from the valve seat 23, and valve port 22 is open (the valve opening state). The rotor 81 is further rotated in the second direction. When the lower stopper member 56 comes into contact with the lower stopper portion 76 of the guide stem member 70, the rotation of the rotor 81 in the second direction is restricted. At this time, the rotor 81 is at a full-open position Rz. When the rotor 81 is at the full-open position Rz, the valve member 40 is positioned farthest from the valve port 22. The lower stopper member 56 and the lower stopper portion 76 are members of a second stopper mechanism S2 that restricts the rotation of the rotor 81 in the second direction.

In the electric valve 5, the respective central axes of the valve body 10 (the body member 11, the valve seat member 21, the valve port 22, and the valve seat 23), the can 30, the valve member 40, the valve stem 50, the coupling mechanism 60 (the holder 61 and the spring receiving member 65), the guide stem member 70 (the circular columnar portion 71, the circular cylindrical portion 72, and the circular plate 74), and the stepping motor 80 (the rotor 81 and the stator 82) are aligned with the axis L.

The body member 11, the valve seat member 21, the can 30, the valve member 40, and the valve stem 50 are made of a metal, such as stainless steel. The guide stem member 70 is made of synthetic resin.

The electric valve control device 90 includes a circuit board 91 on which electronic components (not illustrated) are mounted. As illustrated in FIG. 1, the electric valve control device 90 includes a non-volatile memory 92, a communication device 93, the motor driver 94, and a computer 95. The electric valve control device 90 controls the electric valve 5 according to a command received from the air conditioner control device 110.

The non-volatile memory 92 stores data required to be held even if power is turned off. The non-volatile memory 92 is, for example, EEPROM or flash memory. The non-volatile memory 92 stores a design number Xd and an upper limit number Xu.

The design number Xd is the number of pulses in design input to the stepping motor 80 when the rotor 81 is rotated from the full-open position Rz to the reference position Rx (or the rotor 81 is rotated from the reference position Rx to the full-open position Rz). The first stopper mechanism S1 and the second stopper mechanism S2 wear due to restricting the rotation of the rotor 81. As the wear on the first stopper mechanism S1 increases, the rotor 81 can rotate in the first direction past the reference position Rx. As the wear on the second stopper mechanism S2 increases, the rotor 81 can rotate in the second direction past the full-open position Rz. This causes the rotatable range of the rotor 81 to expand. Thus, the upper limit number Xu is set to a number greater than the design number Xd by considering the expansion of the rotatable range due to the wear. Specifically, the upper limit number Xu is set to a number that is increased from the design number Xd according to the allowable amount of the wear on the first stopper mechanism S1 and the second stopper mechanism S2. For example, the upper limit number Xu is set to a number that is 105% to 120% of the design number Xd. The rotation range of the rotor 81 when the upper limit number Xu of pulses P are input to the stepping motor 80 is a maximum rotatable range W including a range from the full-open position Rz to the reference position Rx. When the rotor 81 can rotate at least within the range from the full-open position Rz to the reference position Rx and at most within the maximum rotatable range W, the rotor 81 can rotate in an appropriate rotation range.

The communication device 93 is connected to the air conditioner control device 110 via a wired communication bus 120 and is able to communicate with the air conditioner control device 110. The air conditioning system 100 utilizes a communication system such as Local Interconnect Network (LIN) or Controller Area Network (CAN). The communication device 93 may be wirelessly connected to the air conditioner control device 110 and be able to wirelessly communicate with the air conditioner control device 110.

The motor driver 94 supplies the driving currents to the stepping motor 80 based on pulses P input from the computer 95. FIG. 4B illustrates an example of correspondence between pulses P and the driving currents supplied by the motor driver 94. In FIG. 4B, (+) denotes supplying the driving current flowing from the terminal A1 to the terminal A2 or the driving current flowing from the terminal B1 to the terminal B2. (−) denotes supplying the driving current flowing from the terminal A2 to the terminal A1 or the driving current flowing from the terminal B2 to the terminal B1. (0) denotes supplying no driving current.

When the computer 95 inputs pulse P[1] to the motor driver 94, the motor driver 94 supplies the coil 85c with the driving current flowing from the terminal A1 to the terminal A2 (+) and supplies the coil 86c with no driving current (0).

When the computer 95 inputs pulse P[2] to the motor driver 94, the motor driver 94 supplies the coil 85c with the driving current flowing from the terminal A1 to the terminal A2 (+) and supplies the coil 86c with the driving current flowing from the terminal B1 to the terminal B2 (+).

When the computer 95 inputs pulse P[3] to the motor driver 94, the motor driver 94 supplies the coil 85c with no driving current (0) and supplies the coil 86c with the driving current flowing from the terminal B1 to the terminal B2 (+).

When the computer 95 inputs pulse P[4] to the motor driver 94, the motor driver 94 supplies the coil 85c with the driving current flowing from the terminal A2 to the terminal A1 (−) and supplies the coil 86c with the driving current flowing from the terminal B1 to the terminal B2 (+).

When the computer 95 inputs pulse P[5] to the motor driver 94, the motor driver 94 supplies the coil 85c with the driving current flowing from the terminal A2 to the terminal A1 (−) and supplies the coil 86c with no driving current (0).

When the computer 95 inputs pulse P[6] to the motor driver 94, the motor driver 94 supplies the coil 85c with the driving current flowing from the terminal A2 to the terminal A1 (−) and supplies the coil 86c with the driving current flowing from the terminal B2 to the terminal B1 (−).

When the computer 95 inputs pulse P[7] to the motor driver 94, the motor driver 94 supplies the coil 85c with no driving current (0) and supplies the coil 86c with the driving current flowing from the terminal B2 to the terminal B1 (−).

When the computer 95 inputs pulse P[8] to the motor driver 94, the motor driver 94 supplies the coil 85c with the driving current flowing from the terminal A1 to the terminal A2 (+) and supplies the coil 86c with the driving current flowing from the terminal B2 to the terminal B1 (−).

The computer 95 is a microcomputer for embedded devices that incorporates a CPU, ROM, RAM, an input/output interface, an analog-to-digital converter, or the like in a single package. The computer 95 may incorporate the non-volatile memory 92, the communication device 93, and the motor driver 94. The CPU executes a program stored in the ROM, and the computer 95 consequently functions as a rotation control unit 96, a voltage obtaining unit 97, and a state determining unit 98.

The rotation control unit 96 inputs pulses P to the stepping motor 80 to rotate the rotor 81 in the first direction or the second direction. Specifically, the rotation control unit 96 receives the command from the air conditioner control device 110 and inputs pulses P[1] to P[8] to the motor driver 94 according to the command. The motor driver 94 supplies the driving current to the coil 85c of the A-phase stator 85 and the coil 86c of the B-phase stator 86 corresponding to pulses P[1] to P[8] input by the rotation control unit 96.

The voltage obtaining unit 97 obtains a voltage generated in the stator 82 by the rotation of the rotor 81 (a voltage induced in the stator 82 due to electromagnetic induction). Specifically, the voltage obtaining unit 97 sequentially obtains the voltages VB generated between the terminals B1 and B2 of the coil 86c of the B-phase stator 86 when the rotation control unit 96 supplies the driving currents corresponding to pulses P[1] and P[5] only to the coil 85c of the A-phase stator 85. The voltage obtaining unit 97 sequentially obtains the voltages VA generated between the terminals A1 and A2 of the coil 85c of the A-phase stator 85 when the rotation control unit 96 supplies the driving currents corresponding to pulses P[3] and P[7] only to the coil 86c of the B-phase stator 86. The voltage obtaining unit 97 does not obtain the voltage VA or VB when the rotation control unit 96 supplies the driving currents corresponding to pulses P[2], P[4], P[6], and P[8] to the coils 85c and 86c. The voltage obtaining unit 97 may sequentially obtain the voltages VA and VB when the rotation control unit 96 supplies the driving currents corresponding to pulses P[1] to P[8] to the coils 85c and 86c. In this configuration, the voltage obtaining unit 97 separates a voltage component due to electromagnetic induction from the voltage generated between the terminals A1 and A2 and obtains the voltage component as the voltage VA. The voltage obtaining unit 97 separates a voltage component due to electromagnetic induction from the voltage generated between the terminals B1 and B2 and obtains the voltage component as the voltage VB. The voltages VA sequentially obtained form a waveform of the voltage VA. The voltages VB sequentially obtained form a waveform of the voltage VB.

The state determining unit 98 determines the state of the electric valve 5 based on the waveforms of the voltages VA and VB obtained by the voltage obtaining unit 97 in an operation to position the rotor 81 at the reference position Rx. The operation is referred to as an initialization operation. The electric valve 5 has a rotation permitted state Sp, a first-direction-rotation restricted state Sr1, and a second-direction-rotation restricted state Sr2. The rotation permitted state Sp is where the rotation of the rotor 81 in the first direction is permitted and the rotation of the rotor 81 in the second direction is permitted. The first-direction-rotation restricted state Sr1 is where the rotation of the rotor 81 in the first direction is restricted. The second-direction-rotation restricted state Sr2 is where the rotation of the rotor 81 in the second direction is restricted.

In this specification, "waveform" refers to the variations in a physical quantity (voltage) over time at a fixed point. "Waveform" is represented on a coordinate plane for visualization, with the vertical axis corresponding to physical quantity and the horizontal axis corresponding to time. The word "waveform" can also refer to physical quantity data associated with time data, such as a data table, stored in the RAM of the computer 95 or the non-volatile memory 92. In a waveform represented on a coordinate plane with the vertical axis corresponding to physical quantity and the horizontal axis corresponding to time where the horizontal axis crosses at a point 0 on the vertical axis, "area of the waveform" refers to an area of a region enclosed by the waveform and the horizontal axis.

A method for determining the state of the electric valve 5 based on the waveforms of the voltages VA and VB by the state determining unit 98 is described.

FIGS. 13 to 15 illustrate examples of the waveforms of the voltages VA and VB measured in the initialization operation. In respective time periods T1 to T9, pulses P[1] to P[8] are input to the stepping motor 80 in ascending order. The waveforms of the voltages VA and VB in time periods before time period T1 are not illustrated in FIG. 13 but are equal (including substantially equal) to the waveforms of the voltages VA and VB in time period T1. The electric valve device 1 has, for example, a period of pulse P of 8 milliseconds and a time period T of 64 milliseconds. In time period T, pulses P[1] to P[8] are input to the stepping motor 80. At time tc, the valve member 40 comes into contact with the valve seat 23, and the rotor 81 is positioned at the valve closing position Rc. At time tx, the upper stopper member 55 comes into contact with the upper stopper portion 75, and the rotor 81 is positioned at the reference position Rx. The rotation of the rotor 81 in the first direction is permitted before time tx and is restricted after time tx.

The waveform of the voltage VA includes A-waves (a1 to a9), B-waves (b1 to b9), C-waves (c1 to c9), D-waves (d1 to d9), and E-waves (e7 to e9). A-waves and B-waves are negative voltage waves (−V) periodically observed in all time periods T. C-waves and D-waves are positive voltage waves (+V) periodically observed in all time periods T. E-waves are positive voltage waves (+V) periodically observed after time tx. The waves each have an amplitude larger than or equal to a predetermined magnitude.

When the areas of the waveform (waveform including C-waves and D-waves) in the sections corresponding to pulse P[7] in time periods T1 to T9 are referred to as areas SA1 to SA9, the areas SA6 to SA9 in time periods T6 to T9 after time tx are smaller than the areas SA1 to SA5 in time periods T1 to T5 before time tx.

D-waves (d1 to d5) are positive voltage waves with relatively large amplitudes before time tx, and D-waves (d6 to d9) are positive voltage waves with relatively small amplitudes after time tx.

No E-waves are observed before time tx, and E-waves (e7 to e9) are periodically observed after time tx. In other words, E-waves are new waves distinct from periodically observed waves in all time periods T and appear periodically after time tx.

The waveform of the voltage VB includes F-waves (f1 to f9), G-waves (g1 to g9), H-waves (h1 to h9), J-waves (j1 to j9), K-waves (k1 to k9), and M-waves (m7 to m9). F-waves and G-waves are positive voltage waves (+V) periodically observed in all time periods T. H-waves, J-waves, and K-waves are negative voltage waves (−V) periodically observed in all time periods T. M-waves are positive voltage waves (+V) periodically observed after time tx. The waves each have an amplitude larger than or equal to a predetermined magnitude.

When the areas of the waveform (waveform including F-waves, G-waves, and H-waves) in the sections corresponding to pulse P[1] in time periods T1 to T9 are referred to as areas SB1 to SB9, the areas SB7 to SB9 in time periods T7 to T9 after time tx are smaller than the areas SB1 to SB6 in time periods T1 to T6 before time tx.

G-waves (g1 to g6) are positive voltage waves with relatively large amplitudes before time tx, and G-waves (g7 to g9) are negative voltage waves with relatively small amplitudes after time tx. A G-wave (each of g7 to g9) is joined with an H-wave after time tx, resulting in one wave.

K-waves (k1 to k5) are negative voltage waves with relatively small amplitudes before time tx, and K-waves (k7 to k9) are negative voltage waves with relatively large amplitudes after time tx.

No M-waves are observed before time tx, and M-waves (m7 to m9) are periodically observed after time tx. In other words, M-waves are new waves distinct from waves periodically observed in all time periods T and appear periodically after time tx.

As a result, the waveforms of the voltages VA and VB have differences before and after time tx. The differences are as follows. (i) The area of the waveform in time period T after time tx is smaller than the area of the waveform in time period T before time tx. (ii) The amplitude of the wave after time tx is different from the amplitude of the wave before time tx. (iii) New waves distinct from waves observed before time tx appear periodically after time tx.

The waveforms of the voltages VA and VB have differences, in the same manner as the waveforms in FIGS. 13 to 15, between before and after the rotation of the rotor 81 in the second direction is restricted by the second stopper mechanism S2. Additionally, when, for example, foreign matter enters the movement mechanism (the valve stem 50 and the guide stem member 70) or the movement mechanism fails, the rotation of the rotor 81 is restricted. In such cases, the waveforms of the voltages VA and VB also have differences, in the same manner as the waveforms in FIGS. 13 to 15, between before and after the rotation of the rotor 81 is restricted.

Therefore, the state determining unit 98 can determine that the rotation of the rotor 81 in the first direction is restricted and that the rotation of the rotor 81 in the second direction is restricted by detecting at least one of the events according to (i) to (iii) described above in the waveforms of the voltages VA and VB.

The state determining unit 98 determines that the electric valve 5 is in the rotation permitted state Sp when any of the events according to (i) to (iii) described above is not detected in the waveforms of the voltage VA or VB obtained by the voltage obtaining unit 97 in the initialization operation. The state determining unit 98 determines that the electric valve 5 is in the first-direction-rotation restricted state Sr1 when at least one of the events according to (i) to (iii) described above is detected while the rotor 81 is rotated in the first direction. The state determining unit 98 determines that the electric valve 5 is in the second-direction-rotation restricted state Sr2 when at least one of the events according to (i) to (iii) described above is detected while the rotor 81 is rotated in the second direction.

The state determining unit 98 may determine that the electric valve 5 is in the first-direction-rotation restricted state Sr1 when two or more of the events according to (i) to (iii) described above are detected while the rotor 81 is rotated in the first direction. The state determining unit 98 may determine that the electric valve 5 is in the second-direction-rotation restricted state Sr2 when two or more of the events according to (i) to (iii) described above are detected while the rotor 81 is rotated in the second direction. The state determining unit 98 may determine that the electric valve 5 is in the rotation permitted state Sp when the electric valve 5 is not in the first-direction-rotation restricted state Sr1 or the second-direction-rotation restricted state Sr2.

An example of an operation of the state determining unit 98 for determining whether the state of the electric valve 5 is the first-direction-rotation restricted state Sr1 or the rotation permitted state Sp when the rotor 81 is rotated in the first direction is described.

When the rotor 81 is rotated in the first direction, the state determining unit 98 determines the state of the electric valve 5 at the end of the present time period T in which pulses P[1] to P[8] are input. Specifically, the state determining unit 98 performs items (1) to (8) below.

(1) The state determining unit 98 calculates the area SA(k) of the waveform of the voltage VA in the section corresponding to pulse P[7] in the present time period T(k). The state determining unit 98 determines that the electric valve 5 is in the first-direction-rotation restricted state Sr1 when the state determining unit 98 detects that the area SA(k) is smaller than the area SA(k−1) of the waveform of the voltage VA in the section corresponding to pulse P[7] in the time period T(k−1) immediately before the present time period T(k) and that difference between the area SA(k) and the area SA(k−1) is larger than or equal to a predetermined first area threshold. The area SA(k) may be an area of the waveform of the voltage VA in a partial section in the time period T(k) or an area of the waveform of the voltage VA throughout the time period T(k).

(2) The state determining unit 98 obtains the amplitude WA(k) of a D-wave of the waveform of the voltage VA in the present time period T(k). The state determining unit 98 determines that the electric valve 5 is in the first-direction-rotation restricted state Sr1 when the state determining unit 98 detects that the amplitude WA(k) is smaller than the amplitude WA(k−1) of a D-wave of the waveform of the voltage VA in the time period T(k−1) immediately before the present time period T(k) and that difference between the amplitude WA(k) and the amplitude WA(k−1) is larger than or equal to a predetermined first amplitude threshold.

(3) The state determining unit 98 determines that the electric valve 5 is in the first-direction-rotation restricted state Sr1 when the state determining unit 98 detects that new E-waves of the waveform of the voltage VA, which are distinct from A-waves, B-waves, C-waves, and D-waves periodically observed in all time periods T, appear periodically in consecutive time periods T (for example, 3 time periods).

(4) The state determining unit 98 calculates the area SB(k) of the waveform of the voltage VB in the section corresponding to pulse P[1] in the present time period T(k). The state determining unit 98 determines that the electric valve 5 is in the first-direction-rotation restricted state Sr1 when the state determining unit 98 detects that the area SB(k) is smaller than the area SB(k−1) of the waveform of the voltage VB in the section corresponding to pulse P[1] in the time period T(k−1) immediately before the present time period T(k) and that difference between the area SB(k) and the area SB(k−1) is larger than or equal to a predetermined second area threshold. The area SB(k) may be an area of the waveform of the voltage VB in a partial section in the time period T(k) or an area of the waveform of the voltage VB throughout the time period T(k).

(5) The state determining unit 98 obtains the amplitude WB1($k$) of a G-wave of the waveform of the voltage VB in the present time period T(k). The state determining unit 98 determines that the electric valve 5 is in the first-direction-rotation restricted state Sr1 when the state determining unit 98 detects that the amplitude WB1($k$) is smaller than the amplitude WB1($k$−1) of a G-wave of the waveform of the voltage VB in the time period T(k−1) immediately before the present time period T(k), and that difference between the amplitude WB1($k$) and the amplitude WB1($k$−1) is larger than or equal to a predetermined second amplitude threshold.

(6) The state determining unit 98 obtains the amplitude WB2($k$) of a K-wave of the waveform of the voltage VB in the present time period T(k). The state determining unit 98 determines that the electric valve 5 is in the first-direction-rotation restricted state Sr1 when the state determining unit 98 detects that the amplitude WB2($k$) is larger than the amplitude WB2($k$−1) of a K-wave of the waveform of the voltage VB in the time period T(k−1) immediately before the present time period T(k) and that difference between the amplitude WB2($k$) and the amplitude WB2($k$−1) is larger than or equal to a predetermined third amplitude threshold.

(7) The state determining unit 98 determines that the electric valve 5 is in the first-direction-rotation restricted state Sr1 when the state determining unit 98 detects that new M-waves of the waveform of the voltage VB, which are distinct from F-waves, G-waves, H-waves, J-waves, and K-waves periodically observed in all time periods T, appear periodically in consecutive time periods T (for example, 3 time periods).

The areas and the amplitudes used in the items (1), (2), and (4) to (6) described above may be moving average values in consecutive time periods T. The state determining unit 98 may perform only a subset of the items (1) to (7).

(8) The state determining unit 98 determines that the electric valve 5 is in the rotation permitted state Sp when the state determining unit 98 does not determine that the electric valve 5 is in the first-direction-rotation restricted state Sr1 in the items (1) to (7).

The state determining unit 98 may be configured to tentatively determine the state of the electric valve 5 in the items (1) to (7). In this configuration, the state determining unit 98 definitely determines that the electric valve 5 is in the first-direction-rotation restricted state Sr1 when the state determining unit 98 tentatively determines multiple times (for example, two or more times) that the electric valve 5 is in the first-direction-rotation restricted state Sr1. The state determining unit 98 determines that the electric valve 5 is in the rotation permitted state Sp when the state determining unit 98 does not definitely determine that the electric valve 5 is in the first-direction-rotation restricted state Sr1.

The state determining unit 98 determines, in the same manner, whether the state of the electric valve 5 is the second-direction-rotation restricted state Sr2 or the rotation permitted state Sp when the rotor 81 is rotated in the second direction.

Next, an example of the operation (the initialization operation) of the electric valve control device 90 is described below with reference to FIGS. 16 and 17.

When the electric valve control device 90 (specifically, the computer 95) receives an initializing command from the air conditioner control device 110 (S110), the electric valve control device 90 starts inputting pulses P to the stepping motor 80 in descending order to rotate the rotor 81 in the second direction (S120). The electric valve control device 90 functions as the rotation control unit 96. Thus, the driving currents corresponding to pulses P are supplied to the stator 82, and the rotor 81 is rotated in the second direction.

The electric valve control device 90 sequentially obtains the voltages VA generated between the terminals A1 and A2 of the coil 85c of the A-phase stator 85 and the voltages VB generated between the terminals B1 and B2 of the coil 86c of the B-phase stator 86 (S130). The electric valve control device 90 functions as the voltage obtaining unit 97.

The electric valve control device 90 determines the state (the second-direction-rotation restricted state Sr2 or the rotation permitted state Sp) of the electric valve 5 based on the voltages VA and VB at the end of the present time period T in which pulses P[8] to P[1] are input (S140). The electric valve control device 90 functions as the state determining unit 98.

When the electric valve 5 is in the rotation permitted state Sp (N in S150), the electric valve control device 90 repeatedly performs Steps S130 to S150.

When the electric valve 5 is in the second-direction-rotation restricted state Sr2 (Y in S150), the electric valve control device 90 stops inputting pulses P to the stepping motor 80 (S160).

Next, the electric valve control device 90 starts inputting pulses P to the stepping motor 80 in ascending order to rotate the rotor 81 in the first direction (S170). Thus, the driving currents corresponding to pulses P are supplied to the stator 82, and the rotor 81 is rotated in the first direction. The electric valve control device 90 functions as the rotation control unit 96.

The electric valve control device 90 sequentially obtains the voltages VA generated between the terminals A1 and A2 of the coil 85c of the A-phase stator 85 and the voltages VB generated between the terminals B1 and B2 of the coil 86c of the B-phase stator 86 (S180). The electric valve control device 90 functions as the voltage obtaining unit 97.

The electric valve control device 90 determines the state (the first-direction-rotation restricted state Sr1 or the rotation permitted state Sp) of the electric valve 5 based on the voltages VA and VB at the end of the present time period T in which pulses P[1] to P[8] are input (S190). The electric valve control device 90 functions as the state determining unit 98.

When the electric valve 5 is in the rotation permitted state Sp (N in S200), the electric valve control device 90 repeatedly performs Steps S180 to S200.

When the electric valve 5 is in the first-direction-rotation restricted state Sr1 (Y in S200), the electric valve control device 90 stops inputting pulses P to the stepping motor 80 (S210).

Next, the electric valve control device 90 obtains the number of pulses input to the stepping motor 80 in a period from determining that the electric valve 5 is in the second-direction-rotation restricted state Sr2 to determining that the electric valve 5 is in the first-direction-rotation restricted state Sr1 (S220). The number of the pulses is referred to as an input number Xi. The input number Xi is the number of pulses input to the stepping motor 80 in a period from Step S170 to Step S210.

When the rotor 81 can rotate at least within the range from the full-open position Rz to the reference position Rx and at most within the maximum rotatable range W, the input number Xi is greater than or equal to the design number Xd and is smaller than or equal to the upper limit number Xu.

When the rotor 81 cannot rotate from the full-open position Rz to the reference position Rx, the input number Xi is smaller than the design number Xd.

When the wear on the first stopper mechanism S1 and the second stopper mechanism S2 increases and the rotor 81 can rotate beyond the maximum rotatable range W, the input number Xi is greater than the upper limit number Xu.

When the input number Xi is greater than or equal to the design number Xd and is smaller than or equal to the upper limit number Xu (N in S230 and N in S240), the electric valve control device 90 determines that the rotor 81 can rotate normally within the range from the full-open position Rz to the reference position Rx and that the rotor 81 is positioned at the reference position Rx (including a position near the reference position Rx). The electric valve control device 90 notifies the air conditioner control device 110 that the initialization operation ends normally (S250).

When the input number Xi is smaller than the design number Xd (Y in S230), the electric valve control device 90 determines that the rotation of the rotor 81 is restricted at a position between the full-open position Rz and the reference position Rx and that the rotor 81 cannot rotate normally within the range from the full-open position Rz to the reference position Rx. The electric valve control device 90 notifies the air conditioner control device 110 that the initialization operation ends abnormally (S260).

When the input number Xi is greater than the upper limit number Xu (N in S230 and Y in S240), the electric valve control device 90 determines that the rotor 81 is rotated beyond the maximum rotatable range W and that the rotor 81 cannot be positioned at the reference position Rx (including a position near the reference position Rx). The electric valve control device 90 notifies the air conditioner control device 110 that the initialization operation end abnormally (S260).

Upon reception of the notification indicating that the initialization operation for the electric valve 5 ends normally, the air conditioner control device 110 starts controlling the flow rate of refrigerant flowing through the pipe 105. Upon reception of the notification indicating that the initialization operation for the electric valve 5 ends abnormally, the air conditioner control device 110 performs an operation for an abnormality, such as an operation to stop the air conditioning system 100, an operation to bring the air conditioning system 100 into a degeneration state, or the like.

As described above, the electric valve device 1 according to the embodiment includes the electric valve 5 and the electric valve control device 90. The electric valve 5 includes the valve body 10 that has the valve port 22, the stepping motor 80 that includes the rotor 81, the valve member 40 that moves toward the valve port 22 when the rotor 81 rotates in the first direction and moves away from the valve port 22 when the rotor 81 rotates in the second direction, the first stopper mechanism S1 that restricts rotation of the rotor 81 in the first direction when the rotor 81 is at the reference position Rx, and the second stopper mechanism S2 that restricts rotation of the rotor 81 in the second direction when the rotor 81 is at the full-open position Rz. The electric valve control device 90 controls the electric valve 5.

In the initialization operation,
(1) the electric valve control device 90 inputs pulses P to the stepping motor 80 to rotate the rotor 81 in the second direction,
(2) the electric valve control device 90 inputs pulses P to the stepping motor 80 to rotate the rotor 81 in the first direction when the electric valve 5 is in the second-direction-rotation restricted state Sr2 while the rotor 81 is rotated in the second direction,
(3) the electric valve control device 90 obtains the number of pulses (the input number Xi) input to the stepping motor 80 to rotate the rotor 81 in the first direction in the period from the second-direction-rotation restricted state Sr2 to the first-direction-rotation restricted state Sr1 when the electric valve 5 is in the first-direction-rotation restricted state Sr1 while the rotor 81 is rotated in the first direction,
(4) the electric valve control device 90 determines that the rotor 81 is able to rotate normally, as the rotor 81 is considered to be normally rotatable within the range from the full-open position Rz to the reference position Rx and to be rotated within the maximum rotatable range W when the input number Xi is greater than or equal to the design number Xd and is smaller than or equal to the upper limit number Xu, and
(5) the electric valve control device 90 determines that the rotor 81 is unable to rotate normally, as the rotor 81 is considered not to be normally rotatable within the range from the full-open position Rz to the reference position Rx or to be rotated beyond the maximum rotatable range W when the input number Xi is smaller than the design number Xd or is greater than the upper limit number Xu.

If the rotor 81 can rotate normally within the range from the full-open position Rz to the reference position Rx, the rotation of the rotor 81 in the second direction is restricted (the second-direction-rotation restricted state Sr2) by the second stopper mechanism S2 when the rotor 81 is rotated in the second direction, and the rotation of the rotor 81 in the first direction is restricted (the first-direction-rotation restricted state Sr1) by the first stopper mechanism S1 when the rotor 81 is rotated in the first direction. Additionally, the first stopper mechanism S1 and the second stopper mechanism S2 wear due to restricting the rotation of the rotor 81. As the wear on the first stopper mechanism S1 increases, the rotor 81 can rotate in the first direction past the reference position Rx. As the wear on the second stopper mechanism S2 increases, the rotor 81 can rotate in the second direction past the full-open position Rz. Consequently, when the rotor 81 can rotate normally within the appropriate rotation range including the range from the full-open position Rz to the reference position Rx, the input number Xi is greater than or equal to the design number Xd and is smaller than or equal to the upper limit number Xu. The upper limit number Xu is set by considering the wear and based on the design number Xd. In this configuration, the electric valve control device 90 can determine whether the rotor 81 can rotate normally within the appropriate rotation range by comparing the input number Xi with the design number Xd and the upper limit number Xu.

The electric valve control device 90 obtains the voltages VA and VB generated in the stator 82 of the stepping motor 80 by the rotation of the rotor 81. The electric valve control device 90 determines whether the electric valve 5 is in the first-direction-rotation restricted state Sr1 and whether the electric valve 5 is in the second-direction-rotation restricted state Sr2, based on at least one of (i) the areas of the waveforms of the voltages VA and VB, (ii) the amplitudes of the waves periodically observed in the waveforms of the voltages VA and VB, and (iii) the periodic appearances of the new wave distinct from the waves periodically observed in the waveforms of the voltages VA and VB. In this configuration, the electric valve control device 90 can determine the state of the electric valve 5 in a relatively simple process for the voltages VA and VB.

The stator 82 includes the A-phase stator 85 and the B-phase stator 86, and the driving currents corresponding to pulses P input to the stepping motor 80 are supplied to the A-phase stator 85 and the B-phase stator 86. The electric valve control device 90 obtains the voltage VB generated in the B-phase stator 86 when the driving current is supplied only to the A-phase stator 85 and the voltage VA generated in the A-phase stator 85 when the driving current is supplied only to the B-phase stator 86. In this configuration, it is not required in the electric valve control device 90 to separate the voltage component due to electromagnetic induction from the voltages generated in the A-phase stator 85 or the B-phase stator 86. As a result, the electric valve control device 90 can obtain the voltages VA and VB in a relatively simple configuration.

The electric valve control device 90 stops inputting pulses P to the stepping motor 80 when the electric valve control device 90 determines that the electric valve 5 is in the first-direction-rotation restricted state Sr1. The electric valve control device 90 stops inputting pulses P to the stepping motor 80 when the electric valve control device 90 determines that the electric valve 5 is in the second-direction-rotation restricted state Sr2. In this configuration, it is possible to inhibit inputting pulse P to the stepping motor 80 from lasting when the rotation of the rotor 81 is restricted. This suppresses the wear on the first stopper mechanism S1 and the second stopper mechanism S2, improving the durability of the electric valve 5.

The electric valve control device 90 described above determines whether the electric valve 5 is in the rotation permitted state Sp, the first-direction-rotation restricted state Sr1, or the second-direction-rotation restricted state Sr2. The electric valve control device 90 may determine whether the electric valve 5 is in a state other than these states.

According to FIG. 13, in the waveform of the voltage VA, D-waves (d1 and d2) are positive voltage waves with a constant amplitude in time periods T before time tc, and D-waves (d3 to d5) are positive voltage waves that gradually decrease in amplitude from time tc to time tx. In the waveform of the voltage VB, K-waves (k1 and k2) are negative voltage waves with a constant amplitude in time periods T before time to, and K-waves k3 to k5) are negative voltage waves that gradually decrease in amplitude from time tc to time tx. These are believed to arise due to a gradual reduction in the rotational speed of the rotor 81 as the rotor 81 passes the valve closing position Rc and the valve closing spring 66 is gradually compressed. As a result, detecting a gradual decrease in amplitude of the wave in the waveform of the voltages VA or in the waveform of the voltage VB enables the rotor 81 to be determined that the rotor 81 is between the valve closing position Rc and the reference position Rx.

Accordingly, the electric valve control device 90 may determine that the electric valve 5 is in a state Sq where the rotor 81 is at a position immediately before the reference position Rx when D-waves periodically observed in the waveform of the voltage VA gradually decrease in amplitude and/or when K-waves periodically observed in the waveform of the voltage VB gradually decrease in amplitude while the rotor 81 is rotated in the first direction. In the state Sq, the rotor 81 is at a position between the valve closing position Rc and the reference position Rx. As a result, the electric valve control device 90 can determine that the rotation of the rotor 81 in the first direction is restricted before the rotor 81 reaches the reference position Rx due to occurrence of some abnormality upon determining that the electric valve 5 is in the first-direction-rotation restricted state Sr1 before determining that the electric valve 5 is in the state Sq while the rotor 81 is rotated in the first direction.

In the initialization operation, the electric valve control device 90 described above positions the rotor 81 at the reference position Rx. In the initialization operation, the electric valve control device 90 positions the rotor 81 at the full-open position Rz instead of the reference position Rx.

That is, in the initialization operation,
(1) the electric valve control device 90 inputs pulses P to the stepping motor 80 to rotate the rotor 81 in the first direction,
(2) the electric valve control device 90 inputs pulses P to the stepping motor 80 to rotate the rotor 81 in the second direction when the electric valve 5 is in the first-direction-rotation restricted state Sr1 while the rotor 81 is rotated in the first direction,
(3) the electric valve control device 90 obtains the number of pulses (the input number Xi) input to the stepping motor 80 to rotate the rotor 81 in the second direction in the period from the first-direction-rotation restricted state Sr1 to the second-direction-rotation restricted state Sr2 when the electric valve 5 is in the second-direction-rotation restricted state Sr2 while the rotor 81 is rotated in the second direction,
(4) the electric valve control device 90 determines that the rotor 81 is able to rotate normally, as the rotor 81 is considered to be normally rotatable within the range from the reference position Rx to the full-open position Rz and to be rotated within the maximum rotatable range W, when the input number Xi is greater than or equal to the design number Xd and is smaller than or equal to the upper limit number Xu, and (5) the electric valve control device 90 determines that the rotor 81 is unable to rotate normally, as the rotor 81 is considered not to be normally rotatable within the range from the reference position Rx to the full-open position Rz or to be rotated beyond the maximum rotatable range W, when the input number Xi is smaller than the design number Xd or is greater than the upper limit number Xu.

In this configuration, the electric valve control device 90 can still determine whether the rotor 81 can rotate normally within the appropriate rotation range.

The electric valve control device 90 described above determines whether the rotation of the rotor 81 is restricted based on the voltages VA and VB generated in the stator 82 of the stepping motor 80 by the rotation of the rotor 81. The electric valve control device 90 may determine whether the rotation of the rotor 81 is restricted, for example, by detecting the rotation angle of the rotor 81 by an angle sensor.

The electric valve 5 described above has a configuration in which the holder 61 mounted on the valve stem 50 pushes the valve member 40 downward via the valve closing spring 66 and the spring receiving member 65 when the rotor 81 is rotated in the first direction. The electric valve 5 may have a configuration in which the rotor 81 and the valve stem 50 directly push the valve member 40 downward when the rotor 81 is rotated in the first direction. In this configuration, when the valve member 40 comes into contact with the valve seat 23, the rotation of the rotor 81 in the first direction is restricted. That is, the valve member 40 and the valve seat 23 are members of a first stopper mechanism, and a position of the rotor 81 when the valve member 40 comes into contact with the valve seat 23 is a reference position Rx.

In this specification, the terms indicating shapes of members, such as "circular cylindrical" and "circular columnar", are also used for members substantially having the shapes indicated by the terms. For example, "circular cylindrical member" includes a circular cylindrical member and a substantially circular cylindrical member.

The embodiment of the present invention is described above. The present invention, however, is not limited to the embodiment. Embodiments obtained by a person skilled in the art appropriately adding, removing, or modifying components according to the embodiment described above, and an embodiment obtained by appropriately combining features of the embodiment are included in the scope of the present invention without departing from the spirit of the present invention.

REFERENCE SIGNS LIST

| | |
|---|---|
| 1 | electric valve device, |
| 5 | electric valve, |
| 10 | valve body, |
| 11 | body member, |
| 14 | valve chamber, |
| 18 | first conduit, |
| 21 | valve seat member, |
| 22 | valve port, |
| 23 | valve seat, |
| 28 | second conduit, |
| 30 | can, |
| 40 | valve member, |
| 41 | stem portion, |
| 42 | valve portion, |
| 43 | sleeve, |
| 50 | valve stem, |
| 51 | first part, |
| 51c | external thread, |
| 52 | second part, |
| 53 | third part, |
| 54 | fixing portion, |
| 55 | upper stopper member, |
| 56 | lower stopper member, |
| 60 | coupling mechanism, |
| 61 | holder, |
| 61a | upper wall portion, |
| 61b | pressure equalizing hole, |
| 62 | valve-member supporting member, |
| 63 | spacer, |
| 65 | spring receiving member, |
| 65a | flange, |
| 66 | valve closing spring, |
| 70 | guide stem member, |
| 71 | circular columnar portion, |
| 71c | internal thread, |
| 72 | circular cylindrical portion, |
| 73 | holding portion, |
| 74 | circular plate, |
| 75 | upper stopper portion, |
| 76 | lower stopper portion, |
| 80 | stepping motor, |
| 81 | rotor, |
| 81a | upper wall portion, |
| 82 | stator, |
| 83 | coupling element, |
| 85 | A-phase stator, |
| 85a | pole tooth, |
| 85b | pole tooth, |
| 85c | coil, |
| 86 | B-phase stator, |
| 86a | pole tooth, |
| 86b | pole tooth, |
| 86c | coil, |
| 90 | electric valve control device, |
| 91 | circuit board, |
| 92 | non-volatile memory, |
| 93 | communication device, |
| 94 | motor driver, |
| 95 | computer, |
| 96 | rotation control unit, |
| 97 | voltage obtaining unit, |
| 98 | state determining unit, |
| 100 | air conditioning system, |
| 101 | compressor, |
| 102 | condenser, |
| 103 | evaporator, |
| 110 | air conditioner control device, |
| 120 | wired communication bus, |
| S1 | first stopper mechanism, |
| S2 | second stopper mechanism, |
| A1 | terminal, |
| A2 | terminal, |
| B1 | terminal, |
| B2 | terminal, |
| L | axis, |
| P | pulse, |
| Rc | valve closing position, |
| Rx | reference position, |
| Rz | full-open position, |
| Sp | rotation permitted state, |
| Sr1 | first-direction-rotation restricted state, |
| Sr2 | second-direction-rotation restricted state, |
| W | maximum rotatable range, |
| Xi | input number, |
| Xd | design number, |
| Xu | upper limit number |

The invention claimed is:

1. An electric valve control device for controlling an electric valve including a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position, a state where the rotation of the rotor in the first direction is restricted being a first-direction-rotation restricted state, a state where the rotation of the rotor in the second direction is restricted being a second-direction-rotation restricted state, a number of pulses in design input to the stepping motor when the rotor is rotated from the full-open position to the reference position being a design number, wherein
(1) the electric valve control device is configured to input pulses to the stepping motor to rotate the rotor in the second direction,
(2) the electric valve control device is configured to input pulses to the stepping motor to rotate the rotor in the first direction when the electric valve is in the second-direction-rotation restricted state while the rotor is rotated in the second direction,
(3) the electric valve control device is configured to obtain a number of pulses, which is an input number, input to the stepping motor in a period from the second-direction-rotation restricted state to the first-direction-rotation restricted state when the electric valve is in the first-direction-rotation restricted state while the rotor is rotated in the first direction,
(4) the electric valve control device is configured to determine that the rotor is able to rotate normally when the input number is greater than or equal to the design number and is smaller than or equal to an upper limit number that is greater than the design number, and
(5) the electric valve control device is configured to determine that the rotor is unable to rotate normally when the input number is smaller than the design number or is greater than the upper limit number.

2. The electric valve control device according to claim 1, wherein the electric valve control device is configured to obtain a voltage generated in a stator of the stepping motor by rotation of the rotor, and
wherein the electric valve control device is configured to determine whether the electric valve is in the first-direction-rotation restricted state and whether the electric valve is in the second-direction-rotation restricted state, based on at least one of (i) an area of a waveform of the voltage, (ii) an amplitude of a wave periodically observed in the waveform of the voltage, and (iii) a periodic appearance of a new wave distinct from the wave periodically observed in the waveform of the voltage.

3. The electric valve control device according to claim 2, wherein the stator includes an A-phase stator and a B-phase stator,
wherein driving currents corresponding to pulses input to the stepping motor are supplied to the A-phase and B-phase stators, and
wherein the electric valve control device is configured to obtain a voltage generated in one of the A-phase and B-phase stators when the driving current is supplied only to the other of the A-phase and B-phase stators.

4. An electric valve device comprising:
the electric valve; and
the electric valve control device according to claim 1.

5. An electric valve control device for controlling an electric valve including a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position, a state where the rotation of the rotor in the first direction is restricted being a first-direction-rotation restricted state, a state where the rotation of the rotor in the second direction is restricted being a second-direction-rotation restricted state, a number of pulses in design input to the stepping motor when the rotor is rotated from the reference position to the full-open position being a design number, wherein
(1) the electric valve control device is configured to input pulses to the stepping motor to rotate the rotor in the first direction,
(2) the electric valve control device is configured to input pulses to the stepping motor to rotate the rotor in the second direction when the electric valve is in the first-direction-rotation restricted state while the rotor is rotated in the first direction,
(3) the electric valve control device is configured to obtain a number of pulses, which is an input number, input to the stepping motor in a period from the first-direction-rotation restricted state to the second-direction-rotation restricted state when the electric valve is in the second-direction-rotation restricted state while the rotor is rotated in the second direction,
(4) the electric valve control device is configured to determine that the rotor is able to rotate normally when the input number is greater than or equal to the design number and is smaller than or equal to an upper limit number that is greater than the design number, and
(5) the electric valve control device is configured to determine that the rotor is unable to rotate normally when the input number is smaller than the design number or is greater than the upper limit number.

6. A method for controlling an electric valve including a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position, a state where the rotation of the rotor in the first direction is restricted being a first-direction-rotation restricted state, a state where the rotation of the rotor in the second direction is restricted being a second-direction-rotation restricted state, a number of pulses in design input to the stepping motor when the rotor is rotated from the full-open position to the reference position being a design number,
the method comprising:
(1) inputting pulses to the stepping motor to rotate the rotor in the second direction;
(2) inputting pulses to the stepping motor to rotate the rotor in the first direction when the electric valve is in the second-direction-rotation restricted state while the rotor is rotated in the second direction;
(3) obtaining a number of pulses, which is an input number, input to the stepping motor in a period from the second-direction-rotation restricted state to the first-direction-rotation restricted state when the electric valve is in the first-direction-rotation restricted state while the rotor is rotated in the first direction;
(4) determining that the rotor is able to rotate normally when the input number is greater than or equal to the design number and is smaller than or equal to an upper limit number that is greater than the design number; and
(5) determining that the rotor is unable to rotate normally when the input number is smaller than the design number or is greater than the upper limit number.

7. A method for controlling an electric valve including a valve body that has a valve port, a stepping motor that includes a rotor, a valve member that moves toward the valve port when the rotor rotates in a first direction and moves away from the valve port when the rotor rotates in a second direction, a first stopper mechanism that restricts rotation of the rotor in the first direction when the rotor is at a reference position, and a second stopper mechanism that restricts rotation of the rotor in the second direction when the rotor is at a full-open position, a state where the rotation of the rotor in the first direction is restricted being a first-direction-rotation restricted state, a state where the rotation of the rotor in the second direction is restricted being a second-direction-rotation restricted state, a number of pulses in design input to the stepping motor when the rotor is rotated from the reference position to the full-open position being a design number, the method comprising:
(1) inputting pulses to the stepping motor to rotate the rotor in the first direction;
(2) inputting pulses to the stepping motor to rotate the rotor in the second direction when the electric valve is in the first-direction-rotation restricted state while the rotor is rotated in the first direction;
(3) obtaining a number of pulses, which is an input number, input to the stepping motor in a period from the first-direction-rotation restricted state to the second-direction-rotation restricted state when the electric valve is in the second-direction-rotation restricted state while the rotor is rotated in the second direction;
(4) determining that the rotor is able to rotate normally when the input number is greater than or equal to the design number and is smaller than or equal to an upper limit number that is greater than the design number; and
(5) determining that the rotor is unable to rotate normally when the input number is smaller than the design number or is greater than the upper limit number.

* * * * *